United States Patent
Ito et al.

[15] 3,667,325
[45] June 6, 1972

[54] AUTOMATIC SHIFT CONTROL SYSTEM FOR AN AUTOMATIC TRANSMISSION FOR VEHICLES

[72] Inventors: Shin Ito; Seitoku Kubo; Takakazu Mori, all of Toyota, Japan

[73] Assignee: Toyota Jidosha Kogyo Kabushiki Kaisha, Toyota-shi, Japan

[22] Filed: Aug. 10, 1970

[21] Appl. No.: 62,557

[30] Foreign Application Priority Data

Oct. 18, 1969 Japan..................................44/83413

[52] U.S. Cl..............................................................74/866
[51] Int. Cl...........................................................B60k 21/00
[58] Field of Search..............................................74/866, 864

[56] References Cited

UNITED STATES PATENTS 3,448,640 6/1969 Nelson....................................74/866
3,433,101 3/1969 Scholl et al............................74/866
3,478,851 11/1969 Smyth et al..........................74/866 X
3,545,307 12/1970 Bildat....................................74/858

Primary Examiner—Leonard H. Gerin
Attorney—Cushman, Darby & Cushman

[57] ABSTRACT

An automatic shift control system for an automatic transmission for vehicles having an engine torque responsive signal generator, a vehicle speed responsive signal generator and a plurality of discriminating circuits generating a shift signal when the relation between these signals satisfies a predetermined condition. One of the discriminating circuits is connected to a second speed starting circuit which is connected in turn to a throttle switching which is turned on and off depending on the position of the throttle valve so that the vehicle can be started in the second gear under a low load and in the first gear under a high load to the engine.

11 Claims, 27 Drawing Figures

PATENTED JUN 6 1972

INVENTORS
SHIN ITO et al

BY Cushman, Darby & Cushman
ATTORNEYS

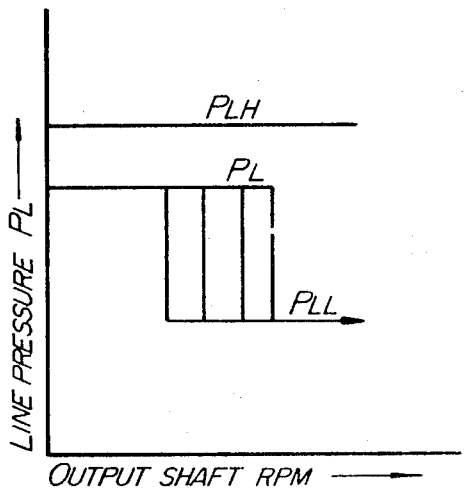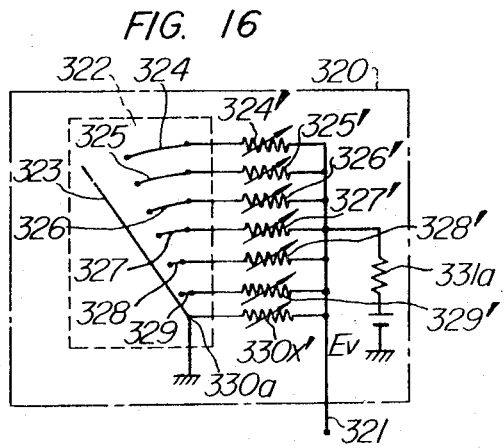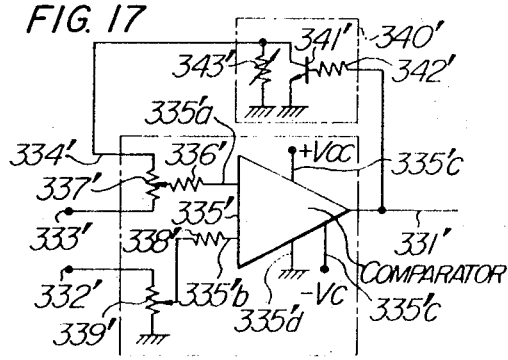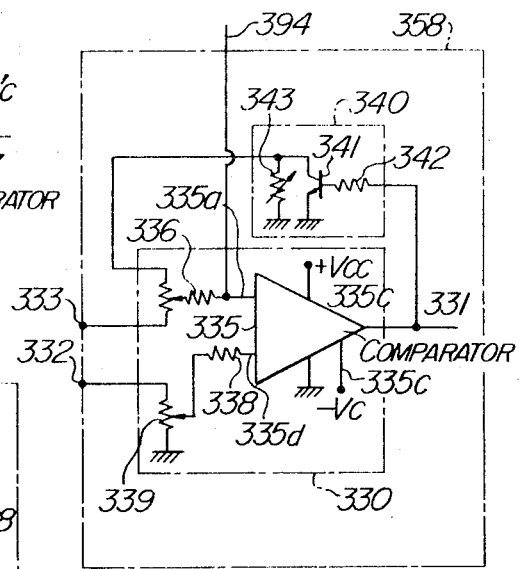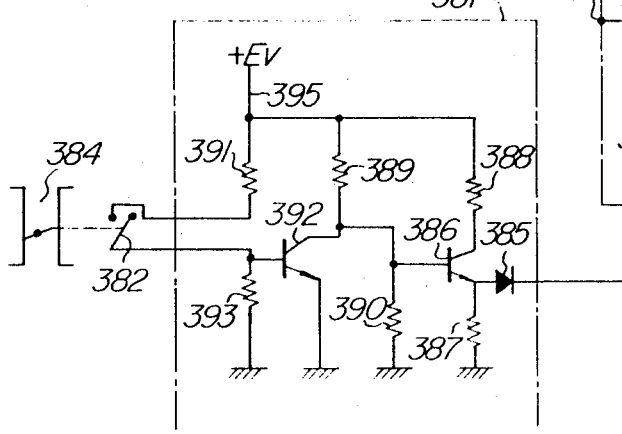

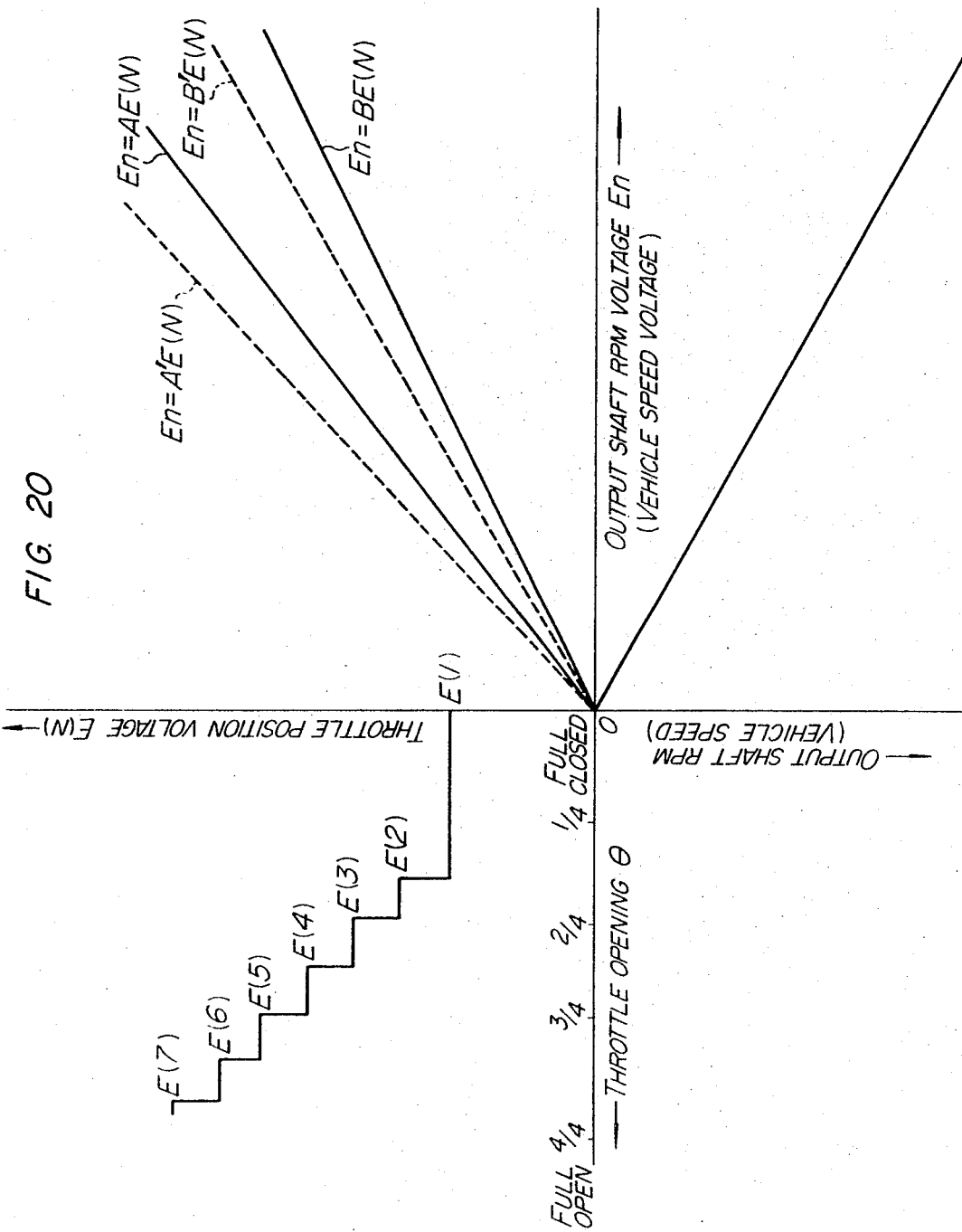

AUTOMATIC SHIFT CONTROL SYSTEM FOR AN AUTOMATIC TRANSMISSION FOR VEHICLES

BACKGROUND OF THE INVENTION

1. Field of the Invention

This invention relates to automatic transmission for automotive vehicles, and more particularly to an automatic shift control system comprising the combination of electrical and fluid control means for use in an automatic transmission. More specifically, this invention relates to an automatic shift control system of the kind described above in which the automatic shift point is electrically controlled so that the vehicle can be started in second gear in a low loaded state of the engine and in first gear in a high loaded state of the engine.

2. Description of the Prior Art

A vehicle equipped with a conventional automatic transmission moves forwards or backwards at very low speed in the drive or forward or backward position of the shift lever, even when the engine is idling because a driving force is continuously produced in such a position of the shift lever. To avoid the forward movement of the vehicle at a crossing or the like, the driver must continuously actuate the brake of the vehicle or return the shift lever to the neutral position. However, such forward or backward movement of the vehicle with the engine idling is not necessarily inconvenient, but is convenient for driving at very low speed on a jammed road or when garaging the vehicle. In the conventional automatic transmission, the gear position is necessarily restored to the first gear or lowest speed gear position as soon as the vehicle is stopped, and in the subsequent starting, the vehicle is necessarily started in first gear. However, with the increase in the number of forward speeds as from two to three, four or more, the gear ratio of the first gear is successively increased, resulting in an increase in the driving force produced in the idling state of the engine and increasing the degree of inconvenience of trouble encountered at crossings. Further, other disadvantages result from the fact that a great impact is developed when the shift lever is shifted from the neutral position to the forward position and an increased number of shifts are required to be performed until the transmission takes its top gear position, which is quite troublesome. In order to deal with this problem, an attempt has been made to start the vehicle in second gear in a low loaded state of the engine and in first gear in a high loaded state of the engine. According to a prior method for realizing such an attempt, a linkage connected to the engine throttle valve is used to control the fluid pressure in the transmission depending on the opening of the throttle valve, thereby varying the automatic shift point by means of the fluid pressure. However, this prior method has been defective in that the operation is inaccurate, the structure is complex and that extra space is required for the linkage.

SUMMARY OF THE INVENTION

It is therefore a primary object of the present invention to provide an automatic shift control system for an automatic transmission which includes a switch means and semiconductor relays which are responsive to the on-off of the switch means, thereby to carry out the starting of the vehicle in second gear in a simple and yet precise manner.

In accordance with the present invention which attains the above object, there is provided, in an automatic transmission for an engine-driven vehicle having a torque converter, a gear unit and frictionally engaging means for accomplishing the selective meshing engagement of the gears in said gear unit, an automatic shift control system comprising means for producing ratio changes by actuating said frictionally engaging means, means for generating a signal responsive to the engine torque or throttle position, means for generating a signal responsive to the r.p.m. of the output shaft or vehicle speed, at least one shift point computer circuit including a discriminating circuit having input terminals connected to said signal generating means to receive the output signals from said signal generating means and generating a shift signal for actuating said ratio change producing means when one of the two signals generated by said signal generating means or the relation between said two signals satisfies a predetermined condition, and a second speed starting circuit connected to one of said signal input terminals of said discriminating circuit for applying a predetermined voltage to said signal input terminal so that a second gear starting signal can be delivered from said discriminating circuit, whereby the vehicle can be started in first or second gear depending on the absence or presence of the predetermined voltage applied to said signal input terminal of said discriminating circuit.

Other objects, features and advantages of the present invention will be apparent from the following detailed description of preferred embodiments thereof taken in conjunction with the accompanying drawings.

BRIEF DESCRIPTION OF THE DRAWINGS

FIGS. 4 through 10 are diagrammatic views illustrating the operating state of a hydraulic actuating circuit in the automatic transmission according to the present invention, wherein FIG. 4 illustrates the operating state at the N position, FIG. 5 the operating state at the D position—1st speed, FIG. 6 the operating state at the D position—2nd speed, FIG. 7 the operating state at the D position—3rd speed, FIG. 8 the operating state at the 2 position—2nd speed, FIG. 9 the operating state at the L position, and FIG. 10 the operating state at the R position.

FIG. 11 is a chart showing the variation in the line pressure $P_L$ controlled by the hydraulic actuating circuit relative to the r.p.m. of the output shaft.

FIG. 16 is a circuit diagram showing the structure of a throttle position responsive circuit employed in the shift signal control system.

FIG. 17 is a circuit diagram showing the structure of a discriminating circuit and an associated feedback circuit constituting a 2–3 shift point computer circuit employed in the shift signal control system.

FIG. 18 is a circuit diagram showing the structure of a discriminating circuit and an associated feedback circuit constituting parts of a 1–2 shift point computer circuit employed in the shift signal control system.

FIG. 19 is a circuit diagram showing the structure of a throttle switch and a second speed starting circuit in the 1–2 shift point computer circuit.

FIG. 20 is a chart showing the relation between signal representative of the output shaft r.p.m. and a signal representative of the throttle position for determining the shift regions according to the present invention.

DESCRIPTION OF THE PREFERRED EMBODIMENTS

Figure 1:
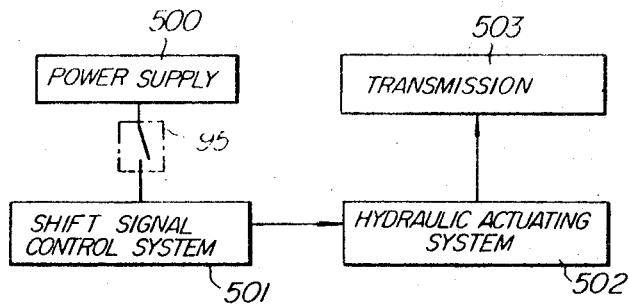
FIG. 1 is a block diagram of an automatic transmission according to the present invention.

Referring to FIG. 1, the automatic transmission embodying the present invention is in a broad way composed of a source of an electrical power supply 500, a shift signal control system 501, a hydraulic actuating system 502 and a transmission unit 503. These components will be described in detail hereunder.

STRUCTURE OF THE TRANSMISSION

Figure 2:
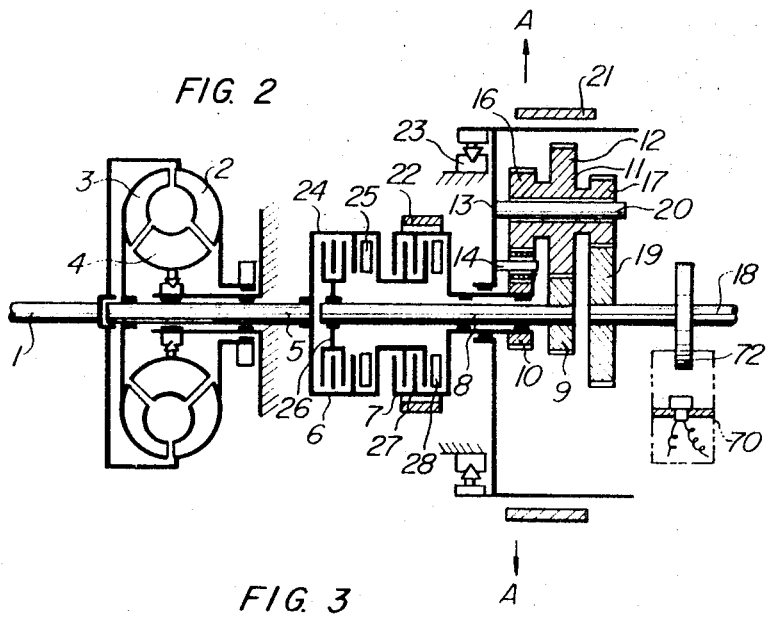
FIG. 2 is a schematic sectional view of a transmission unit to which the present invention is applied.

A torque converter automatic transmission having three forward speeds and one reverse speed as shown in FIG. 2 will be taken as a typical example of the automatic transmission. In FIG. 2, the structure of such a fluid controlled automatic transmission is schematically shown.

A torque converter unit includes a pump impeller 2 directly connected to a crankshaft 1 of an engine. The power developed by the engine is transmitted from the pump impeller 2 to a turbine impeller 3 through the medium of hydraulic fluid, and the fluid is returned to re-enter the pump impeller 2 again by being guided by a stator 4. A rotational force can be continuously derived from a turbine shaft 5 by the repetition of the above flow of the fluid. This rotational force is transmitted from the turbine shaft 5 to a gear unit disposed at the output side of the torque converter unit. As is commonly known, multiple disc clutch means 6 and 7 and brake band means 21 and 22 are automatically controlled by fluid pressure supplied from associated servo means as required and cooperate with a planetary gear mechanism to provide three forward speeds and one reverse speed.

The structure of the gear unit disposed at the output side of the torque converter unit will now be described. The turbine impeller 3 is connected to the turbine shaft 5 which acts as a power input shaft of the planetary gear mechanism. The turbine shaft 5 is splined to a drum 24 for unitary rotation therewith. Disposed within the drum 24 is a multiple disc clutch 6 (hereinafter to be referred to as a front clutch) which is engaged by means of a piston 25 actuated by fluid pressure and which is released by means of backup springs. The drive plates of the front clutch 6 are externally splined to engage the internally splined portion of the drum 24, and the clutch discs are internally splined to engage the externally splined portion of a hub 26 so as to be locked against free rotation. The hub 26 is internally splined to engage the externally splined portion of an intermediate shaft 8. The clutch discs of a multiple disc clutch 7 (hereinafter to be referred to as a rear clutch) are internally splined to engage the externally splined portion of the front clutch drum 24 as shown so as to be locked against free rotation. Thus, the clutch discs of the rear clutch 7 rotate in unison with the front clutch drum 24. The driven plates of the rear clutch 7 are externally splined to engage the internally splined portion of a clutch drum 27 of the rear clutch 7. The rear clutch 7 is engaged by means of a fluid pressure actuated piston 28 and disengaged when fluid pressure applied to the piston 28 is released.

Figure 3:
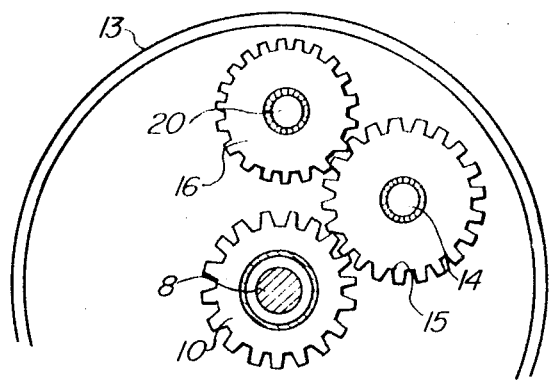
FIG. 3 is an enlarged sectional view taken on the line A—A in FIG. 2 with parts cut away to show in detail the relation between an idler gear (not shown) in FIG. 2 and the sun gear and planet pinion.
Figure 4:
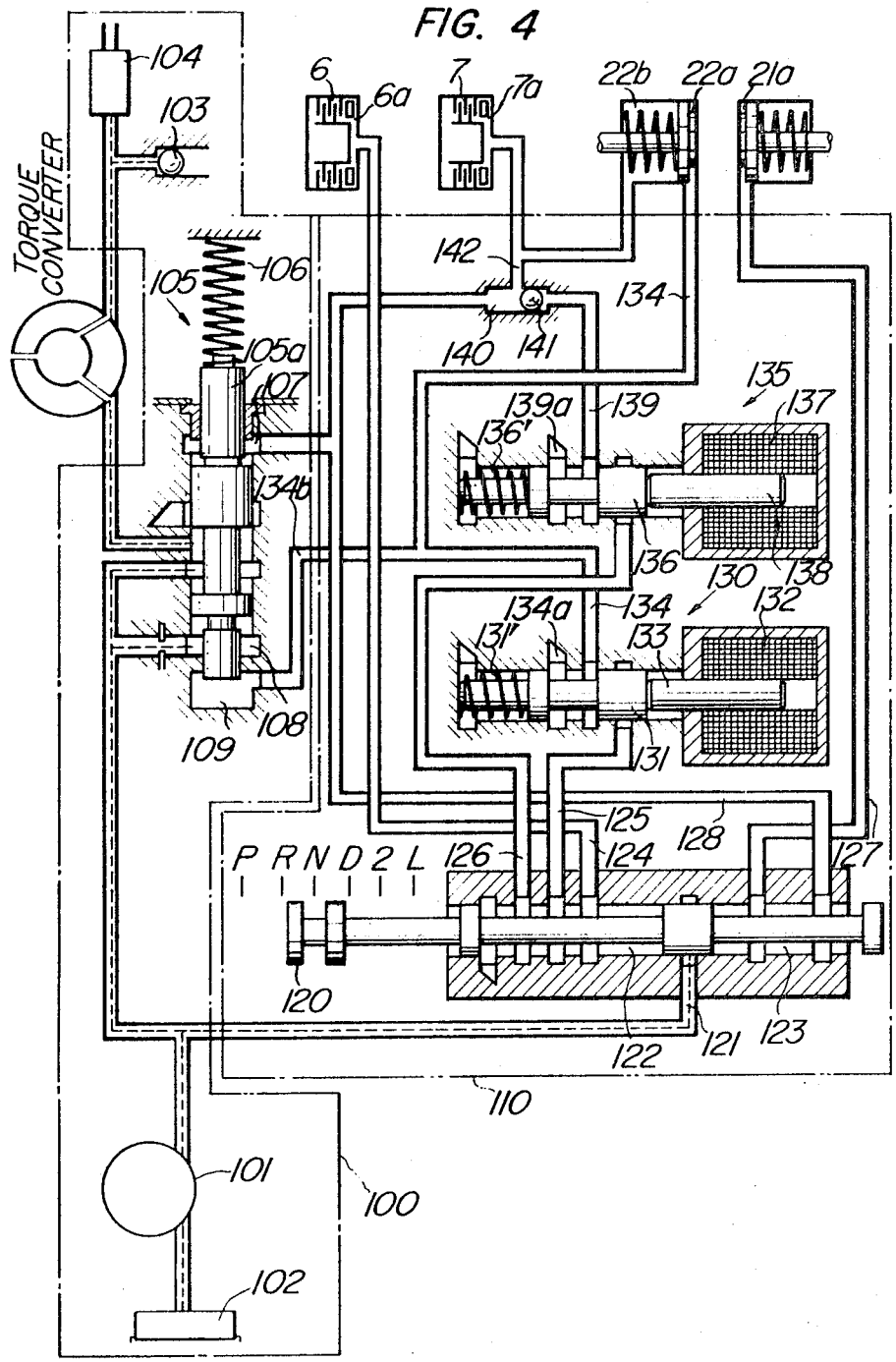

The intermediate shaft 8 which is splined to the hub 26 of the front clutch 6 is connected at its rear end to an input sun gear 9. The rear clutch drum 27 is fixed to a reverse sun gear 10 by a suitable locking means. The input sun gear 9 meshes with each gear 12 of a plurality of, for example, two or three planet pinions 11. The reverse sun gear 10 meshes with idler gears 15 (shown in FIG. 3) which are each rotatably mounted on a pin 14 fixed at one end to a carrier 13, and the idler gears 15 in turn meshes with gears 16 of the planet pinions 11.

The rearmost gear 17 of each planet pinion 11 meshes with a gear 19 mounted at the front end of an output shaft 18 of the transmission. The planet pinions 11 having the gears 16, 12 and 17 and the idler gears or pinions 15 are carried by the carrier 13 by means of pinion pins 20 and 14, respectively. A brake band 21 (hereinafter to be referred to as a rear brake band) encircles the carrier 13 for applying a brake to the latter, and thus the carrier 13 can be fixed against rotation and allowed to freely rotate by fastening and releasing the rear brake band 21. Similarly, a brake band 22 (hereinafter to be referred to as a front brake band) encircles the rear clutch drum 27 so that the rear clutch drum 27, hence the reverse sun gear 10 can be fixed against rotation and allowed to freely rotate by fastening and releasing the front brake band 22. A one-way clutch 23 associated with the carrier 13 functions in a manner similar to the rear brake band 21 in low gear, as set forth hereunder.

With the above structure, three forward speeds and one reverse speed can be obtained by selectively actuating the elements described above in a manner as follows:

First speed — The front clutch 6 and the rear brake band 21 are actuated. (However, when the transmission is driven from the engine, the rear brake band 21 may not be actuated since the one-way clutch 23 is actuated to give the same result as that obtained with the actuation of the rear brake band 21. In this case, however, no driving force is transmitted from the output shaft 18 to the engine). With the front clutch 6 and the rear brake band 21 so actuated, the rotation of the turbine shaft 5 is directly transmitted to the input sun gear 9 through the front clutch 6. Due to the fact that the carrier 13 is locked against rotation by the rear brake band 21, the pinion pins 20 are also held stationary and the rotation of the turbine shaft 5 is transmitted from the input sun gear 9 to the gears 12, thence through the gears 17 to the gear 19 on the output shaft 18 in a speed reducing relation similar to that of an ordinary gear train, thereby providing the first speed.

Second speed — The front clutch 6 is kept actuated and the front brake band 22 is actuated while releasing the rear brake band 21. Thus, the input sun gear 9 is rotated in unison with the turbine shaft 5, but the rear clutch drum 27, hence the reverse sun gear 10 is locked against rotation by the front brake band 22. In this state, the rotation of the turbine shaft 5 is directly transmitted to the input sun gear 9, and the sun gear 9 urges the pinions 11 to rotate in a direction (counterclockwise) opposite to the direction of rotation (clockwise) of the turbine shaft 5. The planet pinions 11 rotating in this direction attempt to rotate the idler gears 15 clockwise through the gears 16. However, due to the fact that the reverse sun gear 10 meshing with the gears 15 is locked against rotation, the pinion pins 14 revolve clockwise around the reverse sun gear 10. This revolving motion is transmitted to the input sun gear 9 and the gear 19 carried by the output shaft 18 which gears are coaxial with and which rotate in the same direction as the turbine shaft 5. Since the number of teeth of the gear 12 is selected to be greater than the number of teeth of the gear 17, the number of revolutions of the intermediate shaft 8 is greater than that of the output shaft 18. In other words, the output shaft 18 is rotated at a reduced speed or second speed.

Third speed — The third speed can be obtained by engaging both the front and rear clutches 6 and 7. The input sun gear 9 and the reverse sun gear 10 are rotated in unison and the whole planetary gear system is unitarily rotated so that the output shaft 18 is rotated at the rotating speed of the turbine shaft 5.

Reverse — When reversing, the rear clutch 7 and the rear brake band 21 are actuated. The carrier 13, hence the pinion pins 14 and 20 are thereby locked against revolution, and the rotation of the turbine shaft 5 is transmitted through the rear clutch 7 to the reverse sun gear 10, thence through the pinions 15 and 17 to the gear 19 mounted on the output shaft 18 so that the output shaft 18 is rotated in the reverse direction.

HYDRAULIC ACTUATING SYSTEM

The arrangement of a hydraulic actuating system of a hydraulic actuating system applied to the transmission according to the present invention is diagrammatically shown in FIGS. 4 through 10. Briefly the hydraulic actuating system comprises a fluid pressure source 100 and a hydraulic actuating circuit 110. The hydraulic actuating circuit 110 includes a manual valve 120, a 1–2 shift means 130, a 2–3 shift means 135, a check valve 140 and fluid passages. The fluid pressure source 100 includes an oil pump 101, an oil strainer 102, a pressure regulator valve 105, a check valve 103, an oil cooler 104 and fluid passages. The fluid pressure source 100 functions to supply fluid under pressure to the torque converter, to the gears for lubricating the same and to the hydraulic actuating circuit 110.

Figure 5:
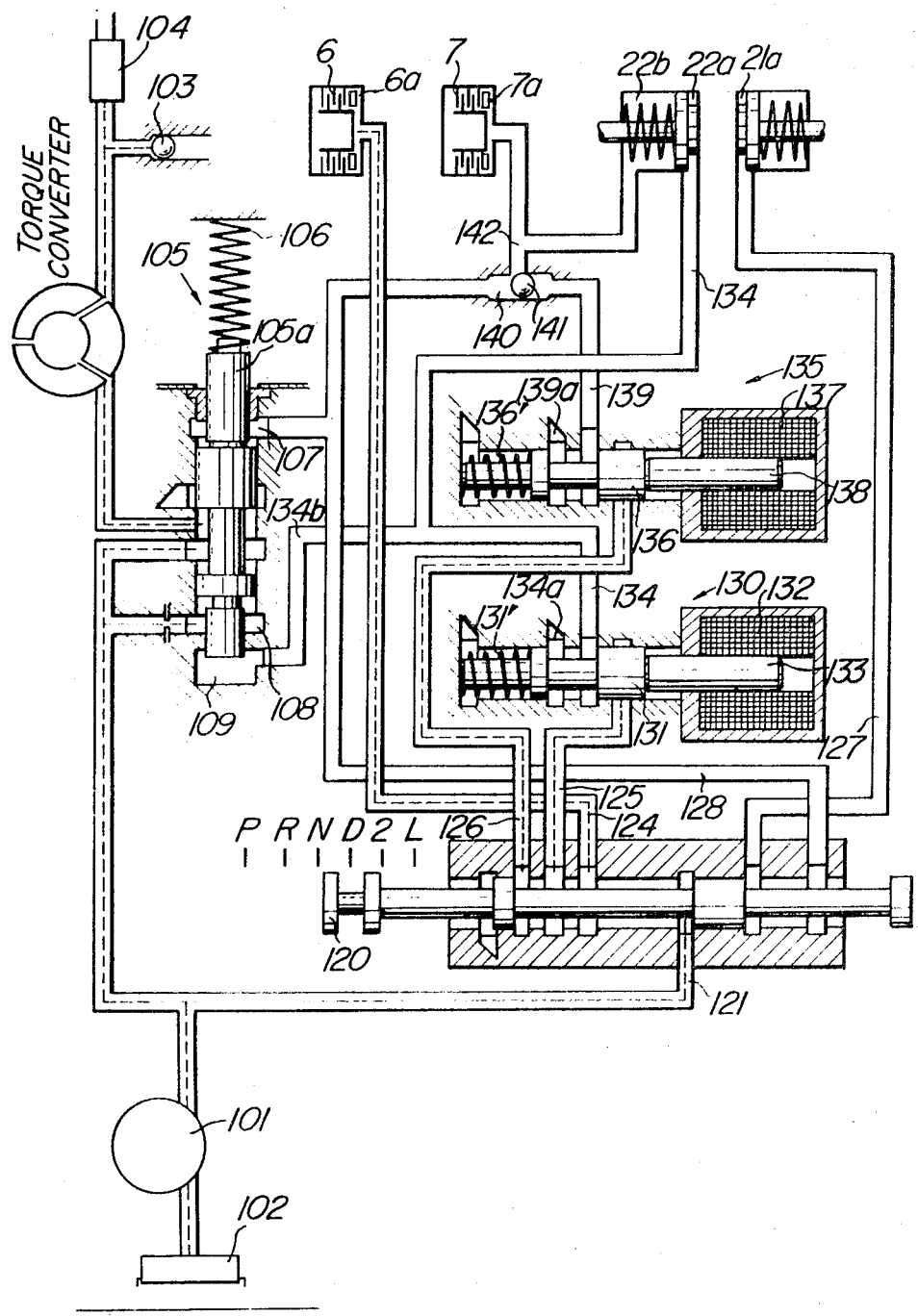

The manual valve 120 is connected with a shift lever (not shown) disposed adjacent to the driver's seat and takes one of the P, R, N, D, 2 and L positions. When now the manual valve 120 takes the N position, a fluid passage 121 is closed and valve chambers 122 and 123 are exhausted as seen from FIG. 4. At the D position of the manual valve 120, the fluid passage 121 communicates with fluid passages 124, 125 and 126 as seen in FIG. 5. The fluid passage 124 leads directly to a front clutch servo chamber 6a, and the fluid passage 125 leads to the apply side 22a of a servo for the front brake band 22 through the 1–2 shift means 130, while the fluid passage 126 leads to a rear clutch servo chamber 7a and to the release side 22b of the servo for the front brake band 22 through the 2–3 shift means 135 and the check valve 140. The 1–2 shift means 130 is composed of a 1–2 shift valve element 131 and a solenoid 132. One end (or the right-hand end as viewed from the drawing) of the valve element 131 is engaged by a moving core 133 of the solenoid 132. When no current is supplied to the solenoid 132, the valve element 131 is urged to its rightward position by a spring 131' engaging the other or left-hand end of the valve element 131 so that the fluid passage 125 communicates with a fluid passage 134 to supply fluid to the apply side 22a of the servo for the front brake band 22 to apply the front brake band 22. When current is supplied to the solenoid 132, the moving core 133 urges the valve element 131 to the leftward position by being actuated by the electromagnetic force of the solenoid 132 so that communication between the fluid passages 125 and 134 is interrupted and the fluid passage 134 communicates with a pressure discharge port 134a to release the front brake band 22. Similarly, the 2–3 shift means 135 includes a 2–3 shift valve element 136 and a solenoid 137. One end (or the right-hand end) of the valve element 136 engages with a moving core 138 of the solenoid 137 as seen from the drawing. When no current is supplied to the solenoid 137, the valve element 136 is urged to its rightward position by a spring 136' engaging the other or left-hand end of the valve element 136 so that the fluid passage 126 communicates with a fluid passage 139 to force a check ball element 141 of the check valve 140 toward a fluid passage 128 to block the fluid passage 128. As a result, the fluid passage 139 communicates with a fluid passage 142 to supply fluid to the rear clutch servo chamber 7a and to the release side 22b of the servo for the front brake band 22 so as to engage the rear clutch 7 and release the front brake band 22. When current is supplied to the solenoid 137, the valve element 136 is urged leftward so that communication between the fluid passages 126 and 139 is interrupted and the fluid passage 139 communicates with a pressure discharge port 139a to become exhausted.

In the first speed at the drive range position or D position— 1st speed shown in FIG. 5, both the solenoids 132 and 137 are energized and the front clutch 6 is solely engaged by the fluid supplied to the front clutch servo chamber 6a through the fluid passage 124 leading out from the manual valve 120. Accordingly, when the transmission is driven from the engine, the one-way clutch 23 is engaged to lock the carrier 13 against rotation so that the first speed can be obtained. In this case, however, no driving force can be transmitted from the output shaft 18 to the engine since a freewheeling condition appears.

Figure 6:
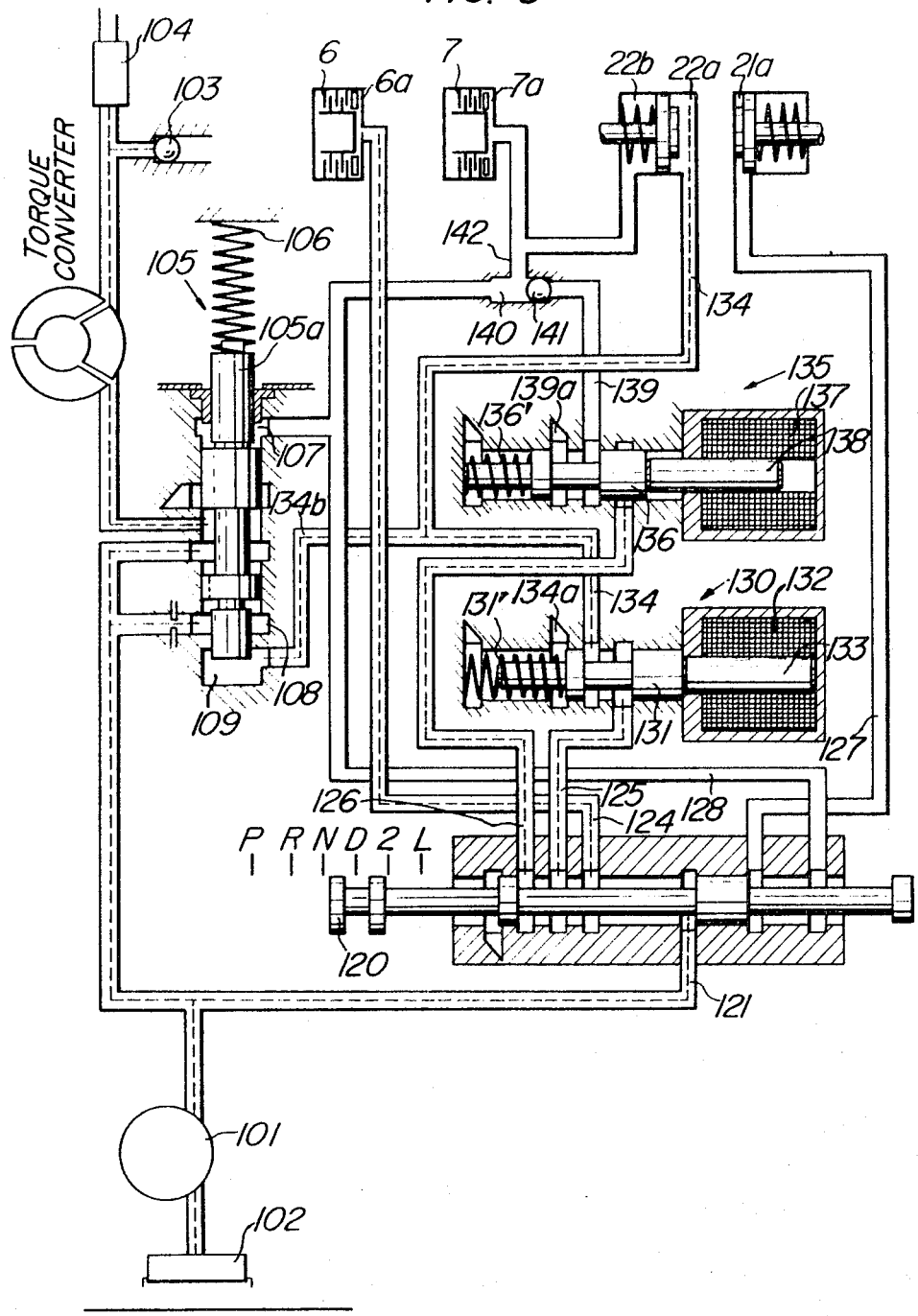

In the second speed of the drive range position or D position—2nd speed shown in FIG. 6, the fluid passage 124 leading to the front clutch servo chamber 6a is kept pressurized and the solenoid 132 for the 1–2 shift valve element 131 is de-energized with the result that the fluid passage 125 communicates with the fluid passage 134 to supply fluid to the apply side 22a of the servo for the front brake band 22 to apply the front brake band 22. Thus, the second speed can be obtained.

Figure 7:
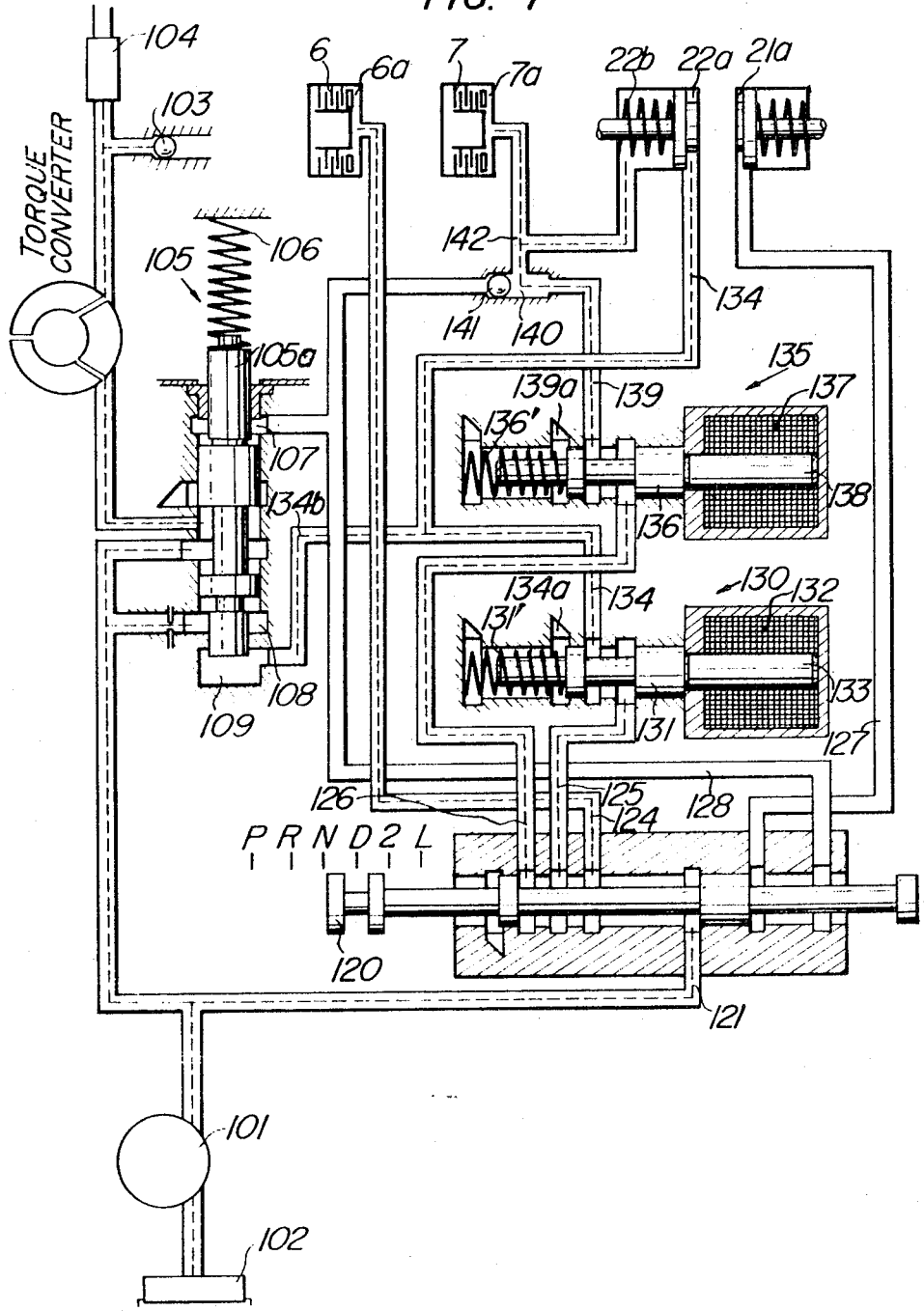

In the third speed at the drive range position or D position—3rd speed shown in FIG. 7, the solenoid 137 for the 2–3 shift valve element 136 is de-energized in addition to the previous de-energization of the solenoid 132 in the D position—2nd speed with the result that the fluid passage 126 communicates with the fluid passage 139 to supply fluid to the rear clutch servo chamber 7a to engage the rear clutch 7 while releasing the front brake band 22. Thus, the third speed can be obtained.

Figure 8:
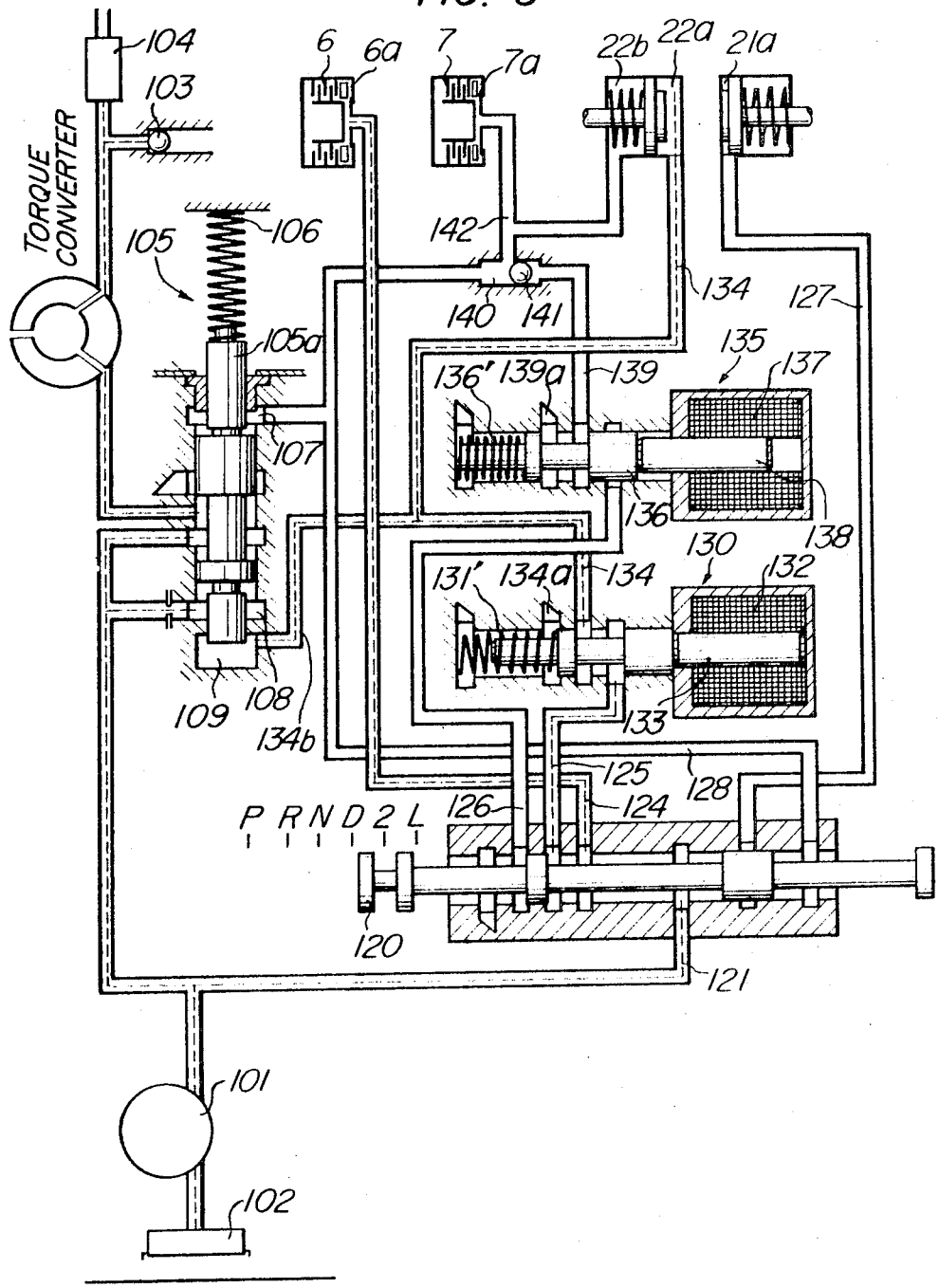

When the manual valve 120 is urged to the 2 position shown in FIG. 8, the fluid passage 126 leading to the 2–3 shift means 135 is exhausted and the fluid passages 124 and 125 communicate solely with the fluid pressure source 100. Accordingly, it is impossible to obtain the third speed regardless of the de-energization of the solenoid 137 for the 2–3 shift valve element 136 and the first and second speeds can be obtained depending on the energization and deenergization of the solenoid and 132 for the 1–2 shift valve element 131.

Figure 9:
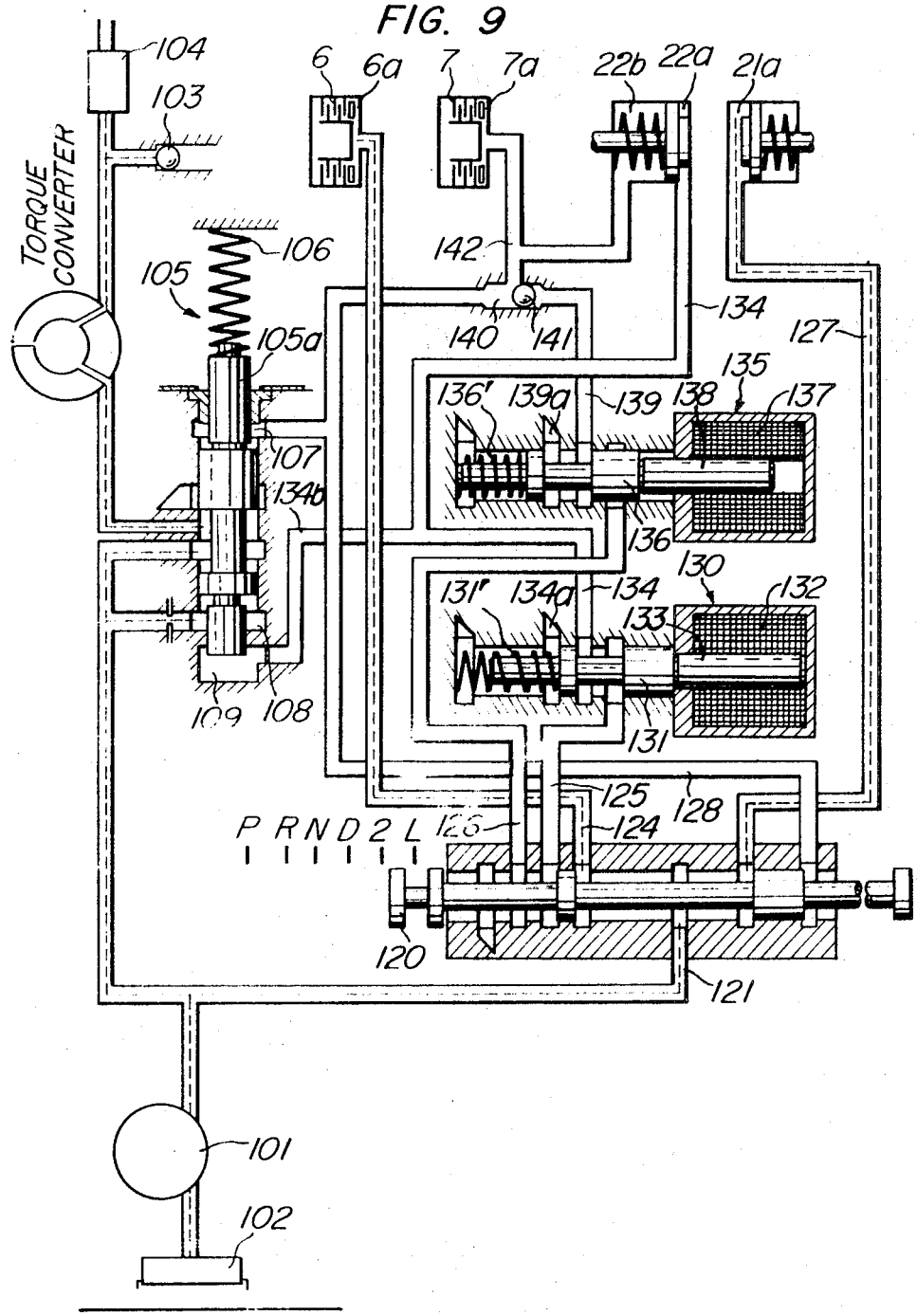

When the manual valve 120 is urged to the L position shown in FIG. 9, the fluid passages 125 and 126 are exhausted and the fluid passages 124 and 127 communicate with the fluid pressure source 100. As a result, fluid is supplied to the front clutch servo chamber 6a and to the apply side 21a of a servo for the rear brake band 21 to engage the front clutch 6 and apply the rear brake band 21. Thus, the first speed can be obtained. The first speed in this L position differs from the first speed in the D position in that the rear brake band 21 is applied to provide for the transmission of the driving force from the output shaft 18 to the engine, thereby permitting the application of engine braking.

Figure 10:
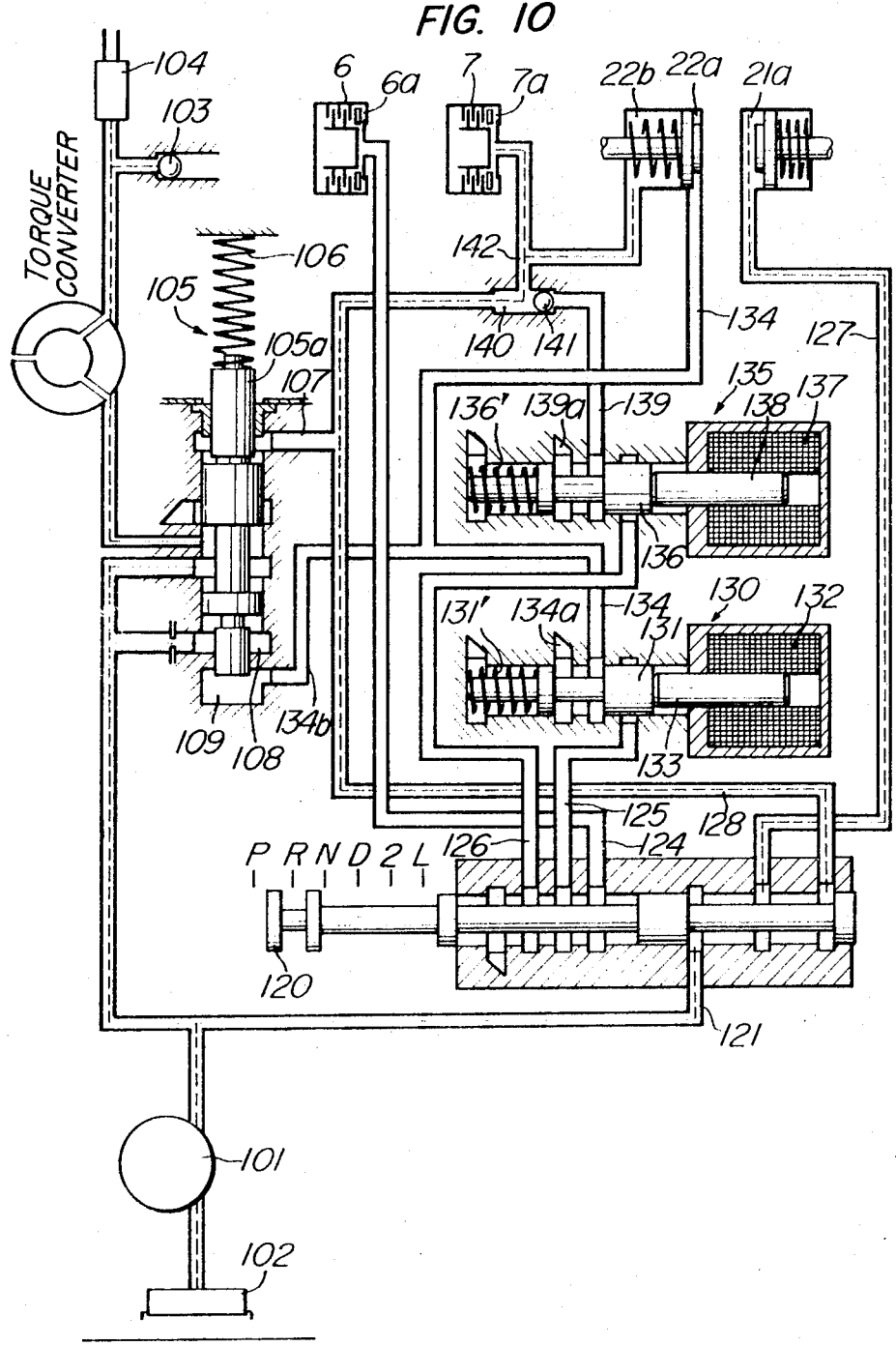

When the manual valve 120 is moved to the R position shown in FIG. 10, the fluid passages 124, 125 and 126 are exhausted and the fluid passages 127 and 128 communicate with the fluid pressure source 100. As a result, fluid is supplied to the rear clutch servo chamber 7a and to the apply side 21a of the servo for the rear brake band 21 to engage the rear clutch 7 and apply the rear brake band 21. Thus, the reverse drive condition for the vehicle can be obtained.

Fluid pressure supplied to the servos is controlled by the pressure regulator valve 105. The pressure regulator valve 105 includes a valve spool 105a whose one or upper end engages with a spring 106. In the R position of the manual valve 120, fluid pressure is supplied through the fluid passage 128 to a valve chamber 107 surrounding the upper portion of the valve spool 105a. Spaced valve chambers 108 and 109 surround the lower portion of the valve spool 105a so that fluid pressure is supplied from the oil pump 101 to the chamber 108 and fluid pressure is supplied to the chamber 109 through a fluid passage 134b. In the D or 2 position of the manual valve 120, fluid pressure is supplied to the fluid passage 125 leading to the 1–2 shift means 130. Then, when the 1–2 shift solenoid 132 is deenergized, the valve element 131 is urged to the upshift position to establish communication between the fluid passages 125 and 134 so that fluid pressure is supplied to the chamber 109 through the fluid passage 134b. On the other hand, the chamber 107 is exhausted in the gear positions except in the reversed position. Thus, a constant flow fluid pressure $P_{LL}$, which is determined by the spring pressure of the spring 106 and fluid pressures in the chambers 108 and 109, is produced at the pressure regulator valve 105.

When the manual valve 120 is in the D or 2 position and the 1–2 shift valve element 131 is urged to the downshift position (corresponding to the first speed) by the operation of the solenoid 132 or when the manual valve 120 is in the L position, the chamber 109 of the pressure regulator valve 105 is exhausted and a constant fluid pressure $P_L$, which is determined by the spring pressure of the spring 106 and fluid pressure in the chamber 108, is produced by the pressure regulator valve 105. In the R position of the manual valve 120, fluid pressure is supplied to the chamber 107 of the pressure regulator valve 105 through the fluid passage 128. Accordingly, a constant high fluid pressure $P_{LH}$, which is determined by the spring pressure of the spring 106 and fluid pressures in the chambers 107 and 108, is produced by the pressure regulator valve 105.

It will be understood from the above description that the fluid passage 134 leading out from the 1-2 shift means 130 is connected to the pressure reducing chamber 109 of the pressure regulator valve 105 so that the fluid pressure produced by the pressure regulator valve 105 is reduced when the 1-2 shift valve element 131 is shifted to the high gear position.

FIG. 11 shows the variation in the fluid pressure or line pressure $P_L$ produced by the pressure regulator valve 105 relative to the number of revolutions of the output shaft 18, hence the vehicle's speed. As will be seen from FIG. 11, a step-down from the constant fluid pressure $P_L$ to the constant low fluid pressure $P_{LL}$ occurs in the 2 or D position of the manual valve 120 when the number of revolutions of the output shaft 18, hence the vehicle speed is increased and the speed ratio is changed from the first to the second speed. Generally, the 1-2 shift point and 2-1 shift point are variable depending on an engine torque responsive signal. Thus, the step-down from the constant fluid pressure $P_L$ to the constant low fluid pressure $P_{LL}$ varies as shown depending on the engine torque responsive signal.

It will be understood that the 1-2 shift means 130 and the 2-3 shift means 135 are operated to vary the pressure regulating action of the pressure regulator valve 105 and to carry out the automatic speed changing operation, and this is accomplished by selectively energizing and de-energizing the solenoids 132 and 137.

The selective energization and de-energization of the solenoids 132 and 137 are carried out under the control of a unique shift signal control system. The shift signal control system is the essential feature of the present invention and various objects of the present invention are attained by this unique shift signal control system.

SHIFT SIGNAL CONTROL SYSTEM

Figure 12:
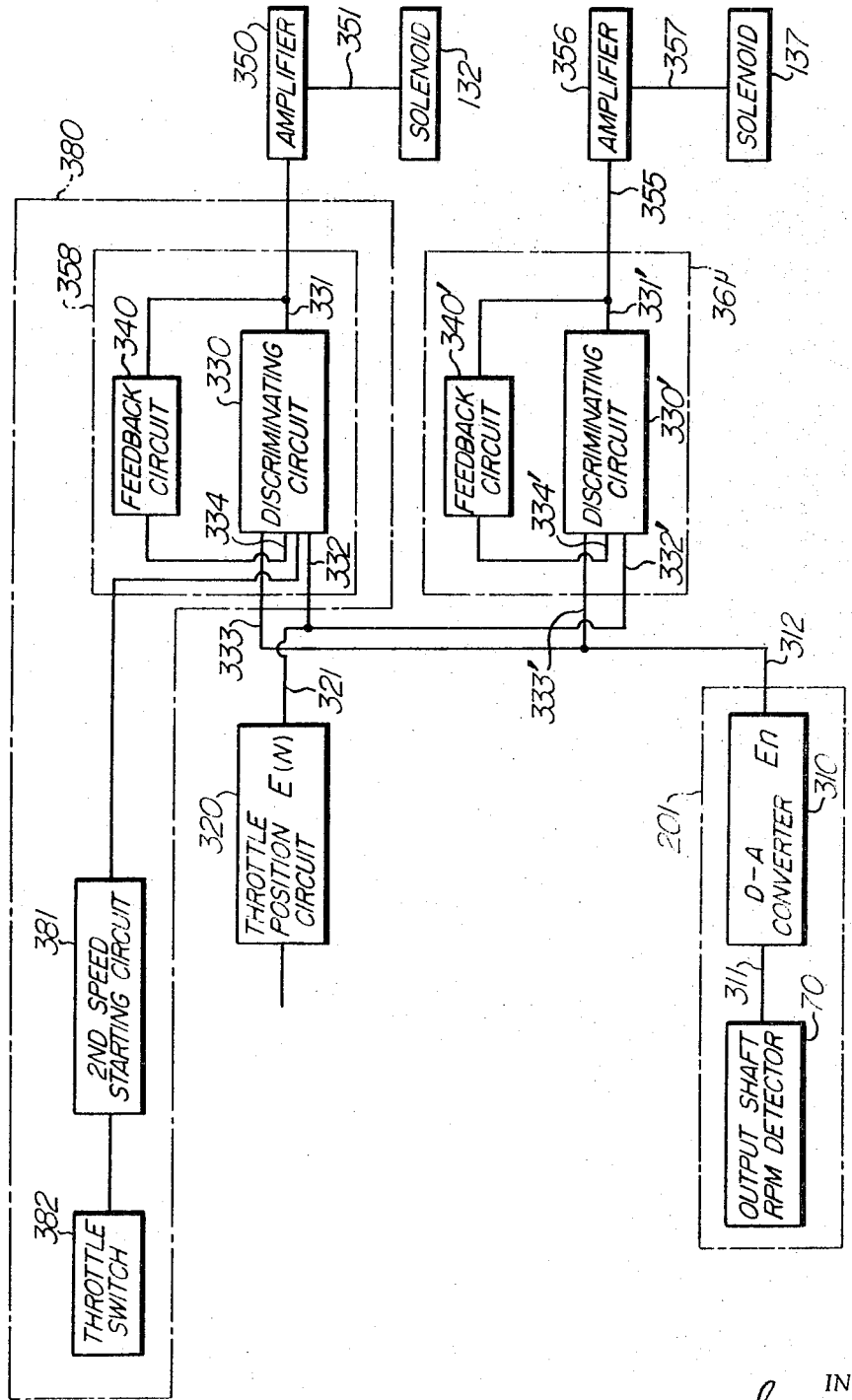
FIG. 12 is a block diagram of a shift signal control system preferably used in the automatic transmission.

Referring to FIG. 12, the shift signal control system which is the essential feature of the present invention includes a throttle position detecting or responsive circuit 320, an output shaft r.p.m. detecting circuit 201, a 1-2 shift point computer circuit 380, a 2-3 shift point computer circuit 361, and amplifiers 350 and 356.

The output shaft r.p.m. detecting circuit 201 includes an output shaft r.p.m. detecting means 70 and a digital-analog converter 310.

Figure 13A:
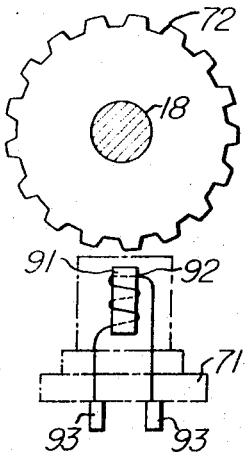
FIGS. 13a and 13b are a side elevational view and a front elevational view, respectively, of an r.p.m. detector preferably used in the shift signal control system.
Figure 13B:
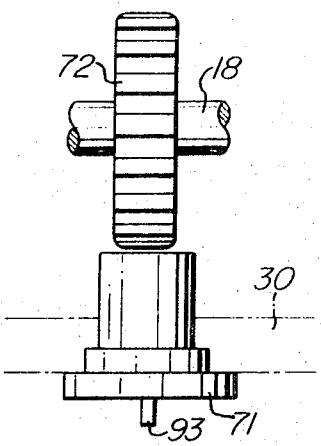

The output shaft r.p.m. detecting means 70 has a structure as shown in FIGS. 13a and 13b and is composed of an r.p.m. detector 71 mounted on the transmission housing 30 and a toothed disc 72 secured integrally to the output shaft 18. The toothed disc 72 has a number of teeth $n$, for example, $n=32$ so that the r.p.m. detector 71 detects an electrical signal S having a frequency which is $n$ times the r.p.m. N of the output shaft 18. Thus, $S = n \times N$.

Knowing the r.p.m. $N$ of the output shaft 18 enables the speed of the vehicle to be known. The structure of the output shaft r.p.m. detecting means 70 will be described in more detail with reference to FIGS. 13a and 13b. As seen from a side elevation in FIG. 13a, the toothed disc 72 which is secured at its center of rotation to the output shaft 18 is a discal plate of a magnetic material having 32 equally spaced teeth formed along its circumference, and the r.p.m. detector 71 is mounted on the housing 30 at a position closely adjacent to the toothed disc 72 in a direction which is diametrically opposite to the latter. The r.p.m. detector 71 is composed of a permanent magnet 91 and a coil 92 wound around the permanent magnet 91. The permanent magnet 91 and the coil 92 are housed in a suitable casing of a nonmagnetic material and the casing is mounted on the transmission housing 30 so that one end of the permanent magnet 91 is disposed in close proximity to the outer periphery of the toothed disc 72. As the tooth portion of the toothed disc 72 passes through the magnetic field of the permanent magnet 91, as a result of the rotation of the toothed disc 72, a variation takes place in the leakage flux of the permanent magnet so that an electromotive force is produced in the coil 92. In the case of the illustrated example, one complete rotation of the toothed disc 72 produces 32 voltage pulses. As described hereinbefore, a voltage signal at an A.C. voltage S is generally obtained when the toothed disc 72 having $n$ teeth rotates at $N$ revolutions per unit time. The voltage signal appears across output terminals 93. It will be apparent to those skilled in the art that, in lieu of the above manner of vehicle speed detection, a small-sized generator may be mounted in coaxial relation with the driven gear operatively connected with the speedometer cable and the output from the generator may be utilized for detecting the speed of the vehicle.

Figure 14:
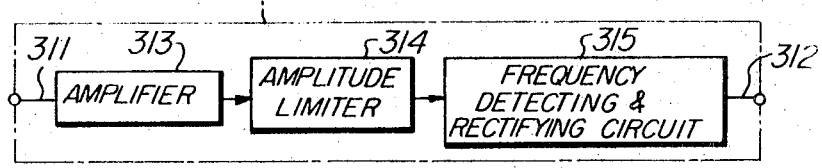
FIG. 14 is a block diagram showing the structure of a digital-analog converter preferably used in the shift signal control system.
Figure 15A:
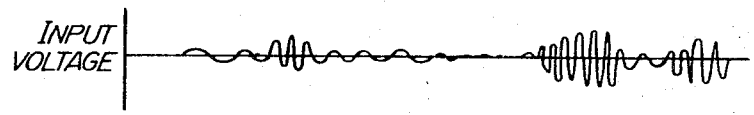
FIGS. 15a, 15b and 15c are graphic illustrations of the operating voltage waveforms appearing in the digital-analog converter shown in FIG. 14.
Figure 15B:
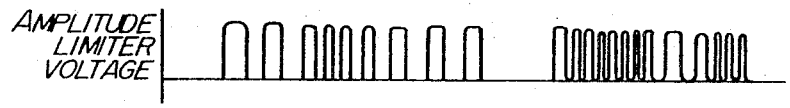
Figure 15C:
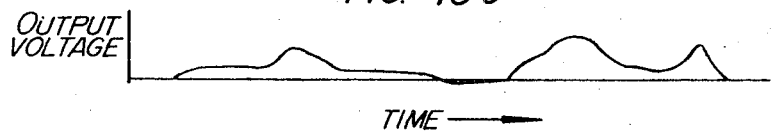

The output voltage signal S delivered from the output shaft r.p.m. detecting means 70 is supplied to the digital-analog converter 310 through a lead 311. The digital-analog converter 310 converts the A.C. signal or digital signal S into a D.C. signal or analog signal. The digital-analog converter 310 has a structure as shown in FIG. 14. The input voltage signal S is supplied by the lead 311 to an amplifier 313 in which the amplitude of the signal S is increased, and then the amplitude of the signal S is limited to a fixed value by an amplitude limiter 314. The A.C. voltage is then converted into D.C. voltage by a frequency detecting, rectifying and amplifying circuit 315, and the D.C. voltage is led out via a lead 312. The voltage waveforms appearing in the digital-analog converter 310 are shown in FIGS. 15a to 15c. FIG. 15a shows the voltage waveform of the signal S and the same waveform is maintained after the signal S has been amplified. FIG. 15b shows the waveform of the output from the amplitude limiter 314. FIG. 15c shows the waveform of the output $E_n$ from the frequency detecting, rectifying and amplifying circuit 315, and this output $E_n$ is an analog voltage which is proportional to the r.p.m. of the output shaft 18.

The throttle position responsive circuit 320 has a structure as shown in FIG. 16. The reference numeral 322 designates a multi-contact switch which is responsive to the position of the throttle valve in the carburetor, or in other words, responsive to the degree of depression of the accelerator pedal. (This switch may respond to a displacement of a member responsive to the negative pressure in the air intake pipe, since the switch is a means for detecting an engine torque responsive signal.) The multi-contact switch 322 has a movable contact 323 and a plurality of stationary contacts 324, 325, 326, 327, 328 and 329. The switch 322 is so constructed that the movable contact 323 is successively released from contact with the stationary contacts 324, 325, 326, 327, 328 and 329 as the opening $S_\theta$ of the throttle valve is successively increased to $S_{\theta(1)}$, $S_{\theta(2)}$, $S_{\theta(3)}$, $S_{\theta(4)}$, $S_{\theta(5)}$ and $S_{\theta(6)}$. The movable contact 232 is grounded at one end thereof. The stationary contacts 324, 325, 326, 327, 328 and 329 are connected at one end to respective variable resistors 324', 325', 326', 327', 238' and 329', while one end of a variable resistor 330x' is grounded. The variable resistors 324' through 330x' are connected at the other end in common to a lead 321. A resistor 331a is connected at one end to the lead 321, and a fixed voltage E is applied to the other end of the resistor 331a. The variable resistor 330x' is so adjusted that a voltage $E_{(7)}$ appears on the lead 321 when $S_\theta = S_{\theta(7)}$ due to the full opening of the throttle valve in the carburetor. Then, when the throttle valve opening S is reduced to $S_{\theta(6)}$, the movable contact 323 engages solely with the stationary contact 329. The variable resistor 329' is so adjusted that an output $E_{(6)}$ appearing on the lead 321 in such a position of the switch 322 is given by $$\frac{R_6 || R_7}{R_6 || R_7 + R} \cdot E = E_{(6)},$$

where $R$, $R_6$ and $R_7$ are the resistances of the resistor 331a, variable resistor 329' and variable resistor 330x', respectively, and $R_6 \| R_7$ is the resistance given when the variable resistors 329' and 330x' are connected in parallel with each other. The variable resistor 328' is so adjusted that an output $E_{(5)}$ appearing on the lead 321 in response to the throttle valve opening $S_\theta$ of $S_{\theta(5)}$ is given by $$\frac{R_7\|R_6\|R_5}{R_7\|R_6\|R_5+R} \cdot E = E_{(5)},$$

where $R_5$ is the resistance of the variable resistor 328'. Similarly, the variable resistors 327', 326', 325' and 324' are so adjusted that the outputs appearing on the lead 321 are in response to the opening of the throttle valve. $S_\theta$ of $S_{\theta(4)}$, $S_{\theta(3)}$, $S_{\theta(2)}$ and $S_{\theta(1)}$ are given by $E_{(4)}$, $E_{(3)}$, $E_{(2)}$ and $E_{(1)}$, respectively. Thus, the voltages $E_{(1)}$, $E_{(2)}$, $E_{(3)}$, $E_{(4)}$, $E_{(5)}$, $E_{(6)}$ and $E_{(7)}$ appear on the lead 321 in response to the throttle valve opening $S\theta$ of $S_{\theta(1)}$, $S_{\theta(2)}$, $S_{\theta(3)}$, $S_{\theta(4)}$, $S_{\theta(5)}$, $S_{\theta(6)}$ and $S_{\theta(7)}$, respectively. In other words, a stepped signal voltage $E_{(N)}$ ($N = 1, 2, 3, 4, 5, 6, 7$) is delivered from the throttle positions responsive circuit 320 to the lead 321 depending on the opening of the throttle valve. The switch 322 is shown as having six stationary contacts for obtaining seven different outputs. It is apparent that the number of stationary contacts may be further increased in order to obtain a more complex stepped signal. The 2–3 shift point computer circuit 361 includes a discriminating circuit 330' and a feedback circuit 340'. The discriminating circuit 330' and the feedback circuit 340' have a structure as shown in FIG. 17. The discriminating circuit 330' includes a comparator 335' of any suitable conventional type such as one sold under the tradename of $\mu$PC 71 by Nippon Electric Co., Ltd. or N72710N supplied by Texas Instruments Co., Ltd. An input resistor 336' is connected at one end to an input terminal 335a' of the comparator 335' and at the other end to the movable arm of a variable resistor 337'. The variable resistor 337' is connected across the input terminals 333' and 334' of the discriminating circuit 330'. A resistor 338' is connected at one end to the movable arm of a variable resistor 339' and at the other end to an input terminal 335b' of the comparator 335'. The variable resistor 339' is connected at one end to the input terminal 332' of the discriminating circuit 3 30 and is grounded at the other end. Terminals 335c, 335d and 335e' of the comparator 335' are connected to the positive terminal of a power source, respectively, to ground and to the negative terminal of the power source, respectively. The feedback circuit 340' includes an NPN transistor 341', a resistor 324' and a variable resistor 343'. The NPN transistor 341' has its emitter grounded and its base connected to the output lead 331' of the discriminating circuit 330' through the resistor 342'. The collector of the transistor 341' is connected to the fixed terminal of the variable resistor 343' and the junction point therebetween is connected to the input terminal 334' of the discriminating circuit 330'. The variable contact of the varia ble resistor 343 is grounded.

In operation, assuming that a voltage or "1" appears on the output lead 331' when no signal is supplied to the input terminals 332', 333' and 334' of the discriminating circuit 330', then a base current is supplied through the resistor 342' to the transistor 341' in the feedback circuit 340' with the result that the transistor 341' conducts and the variable resistor 343' is shorted thereacross. Then, when a voltage signal $E_{(N)}$ ($N = 1, 2, 3, \ldots$) representative of the throttle position and a voltage signal $En$ representative of the output shaft r.p.m. are applied to the respective input terminals 332' and 333' of the discriminating circuit 330', a voltage $$E_{n'} = \frac{R_b}{R_a + R_c} \cdot En$$

appears at the movable arm of the variable resistor 337', where $R_a$ is the resistance between the input terminal 333' and the movable arm of the variable resistor 337' and $R_b$ is the resistance between the movable arm of the variable resistor 337' and the collector of the transistor 341' in the feedback circuit 340', while a voltage $E_{(N)'}$ appears at the movable arm of the variable resistor 339' and is given by $$E_{(N)'} = \frac{R_e}{R_d + R_e} \cdot E_{(N)},$$

where $R_d$ is the resistance between the movable arm of the variable resistor 339' and the input terminal 332', and $R_e$ is the resistance between the movable arm of the variable resistor 339' and ground.

The voltage $E_{n'}$ is applied to the input terminal 335a' of the comparator 335' through the resistor 336', and the voltage $E_{(N)'}$ is applied to the input terminal 335b' of the comparator 335' through the resistor 338'. The comparator 335' compares $E_{(N)'}$ with $E_{n'}$. Thus, when $E_{n'} - E_{(N)'}$ is positive, no signal voltage or "0" is delivered from the comparator 335', while when $E_{n'} - E_{(N)'}$ is negative, a signal voltage or "1" is delivered from the comparator 335' to appear on the output lead 331'. The resistors 336' and 338' are protective resistors which protect the comparator 335' against any large inputs that may be applied to the input terminals 335a' and 335b' of the comparator 335'. The comparator 335' may be composed of a differential amplifier and a Zener diode or a Schmitt circuit. When "0" or no voltage appears on the output lead 331' of the discriminating circuit 330' due to $E_{n'} - E_{(N)'} > 0$, no base current is supplied to the base of the transistor 341' in the feedback circuit 340' through the resistor 342' thereby to turn off the transistor 341'. Therefore, the potential at the input terminal 335a' of the comparator 335' is now given by $$E_n'' = \frac{R_b + R_c}{R_a + R_b + R_c} \cdot E_n$$

which is larger than $E_{n'}$ or $E_{n''} > E_{n'}$ in spite of the fact that $E_n$ remains the same. In the above equation, $R_c$ is the resistance of the variable resistor 343'. Thus, the output appearing on the output lead 331' of the comparator 335' turns from "0" to "1" at a smaller value of $E_n$ (that is, at a lower vehicle speed) than when the output turns from "1" to "0." In other words, the amount of modification of the signal $E_n$ representative of the output shaft r.p.m. by the resistances is varied by means of the feedback circuit 340' depending on whether the output appearing on the output lead 331' of the discriminating circuit 330' is "0" or "1" so as to thereby vary the discriminating condition of the discriminating circuit 330'. By this method, a stable signal appear on the output lead 331' and no hunting takes between the on and off positions.

It will thus be seen that the relation $E_n = BE_{(N)}$ holds between the signal $E_n$ representative of the output shaft r.p.m. and the signal $E_{(N)}$ representative of the throttle position when the output signal appearing on the output lead 331' of the discriminating circuit 330' is changed from "1" to "0", and the relation $E_n = B'E_{(N)}$ holds between these two signals when the output signal appearing on the output lead 331' is changed from "0" to "1." These two equations can be computed by suitably setting the variable resistors 337', 339' and 343' in the discriminating circuit 330' and feedback circuit 340' constituting the 2–3 shift point computer circuit 361. Thus, the output signal appearing on the output lead 331' varies from "1" to "0" or the output voltage ceases to appear thereon when $E_n$ is increased to make a shift to the right-hand side of the line $E_n = BE_{(N)}$ in FIG. 20. When $E_n$ is decreased in the absence of the output voltage until the relation $E_n \leq B'E_{(N)}$ is thereby achieved, the signal voltage appears on the output lead 331' again.

The amplifier 356 is a conventional one, and its sole function is the amplification of the output signal from the discriminating circuit 330' for energizing the solenoid 137. This amplifier 356 is unnecessary when the output signal from the discriminating circuit 330' can satisfactorily energize the solenoid 137. The solenoid 137 is well known in the art and any description of it is unnecessary. It is apparent that an alternative circuit arrangement may be employed so that "0" is delivered from the discriminating circuit 330' to appear on the output lead 331' when $E_n - E_{(N)} < 0$, while "1" appears on the output lead 331' when $E_n - E_{(N)} > 0$ and the solenoid 137 is energized in response to the appearance of "1" on the output lead 331'. Although the illustrated example refers to the case in which the feedback circuit 340' acts to vary the potential at the input terminal 335a', the same result can be obtained by varying the potential at the input terminal 335b' in a manner contrary to the variation of the potential at the input terminal 335a'.

The digital-analog converter 310 is so constructed that a gradually increasing positive voltage appears on the output lead 312 as the frequency of a signal supplied through the input lead 311, hence the speed of the vehicle is increased. The output lead 321 of the throttle position responsive circuit 320 may be connected with the output lead 312 of the digital-analog converter 310, and the input terminal 332' of the discriminating circuit 330' which has been connected with the output lead 321 of the throttle position responsive circuit 320 may be connected to ground or to a source of a fixed voltage to accomplish zero-balancing. The throttle position responsive circuit 320 may be constructed so that the resistance between the output thereof and ground is reduced as the opening of the throttle valve is increased.

The digital-analog converter 310 may be constructed in such a way that a gradually decreasing negative voltage appears on the output lead 312 as the speed of the vehicle is increased. In this case too, the throttle position responsive circuit 320 may be such that the resistance between the output thereof and ground is reduced as the opening of the throttle valve is increased, and the output of the digital-analog converter 310 and the output of the throttle position responsive circuit 320 may be connected in common to the input terminal 333' of the discriminating circuit 330', while the input terminal 332' of the discriminating circuit 330' may be connected to ground or to a source of a fixed voltage for accomplishing zero-balancing.

The 1–2 shift point computer circuit 380 for attaining starting in the second speed gear under a low load to the engine, which is the primary purpose of the present invention, will now be described. The 1–2 shift point computer circuit 380 includes a shift point computing circuit 358, a second speed starting circuit 381 and a throttle switch 382.

The shift point computing circuit 358 has a structure as shown in FIG. 18 and is composed of a discriminating circuit 330 and a feedback circuit 340. The shift point computing circuit 358 is generally similar in structure to the 2–3 shift point computer circuit 361 described with reference to FIG. 17 except that a signal from the second speed starting circuit 381 is applied to the vehicle speed responsive signal input terminal 335a of the comparator 335. The operation of the discriminating circuit 330 and feedback circuit 340 is similar to that of the discriminating circuit 330' and feedback circuit 340' constituting the 2–3 shift point computer circuit 361. Thus, referring to FIG. 20, a 1–2 upshift takes place when the relation $E_n > AE_{(N)}$ holds and a 2–1 downshift takes place when the relation $E_n < A'E_{(N)}$ holds.

The throttle switch 382 is used to derive a signal representative of a low loaded state of the engine. The throttle switch 382 is interlocked with the engine throttle valve 384 in the carburetor so that it is turned off in the fully closed position of the throttle valve 384, while it is turned on when the throttle valve 384 is urged or opened to a certain predetermined position as shown in FIG. 19.

The structure of the second speed starting circuit 381 will be described with reference to FIG. 19. The second speed starting circuit 381 includes a first NPN transistor 392 and a second NPN transistor 386. The first transistor 392 has its base connected to the movable contact of the throttle switch 382 and is simultaneously grounded through a resistor 393. The emitter of the first transistor 392 is grounded. The collector of the first transistor 392 is connected to a power supply lead 395 through a resistor 389 and to the base of the second transistor 386 and is grounded through a resistor 390. The collector of the second transistor 386 is connected to the power supply lead 395 through a resistor 388. The emitter of the second transistor 386 is grounded through a resistor 387 and is connected to the vehicle speed responsive signal input terminal 335a of the comparator 335 by a lead 394 through a diode 385. One end of a resistor 391 is connected to the stationary contact of the throttle switch 382, while the other end of the resistor 391 is connected to the power supply lead 395.

Figure 21:
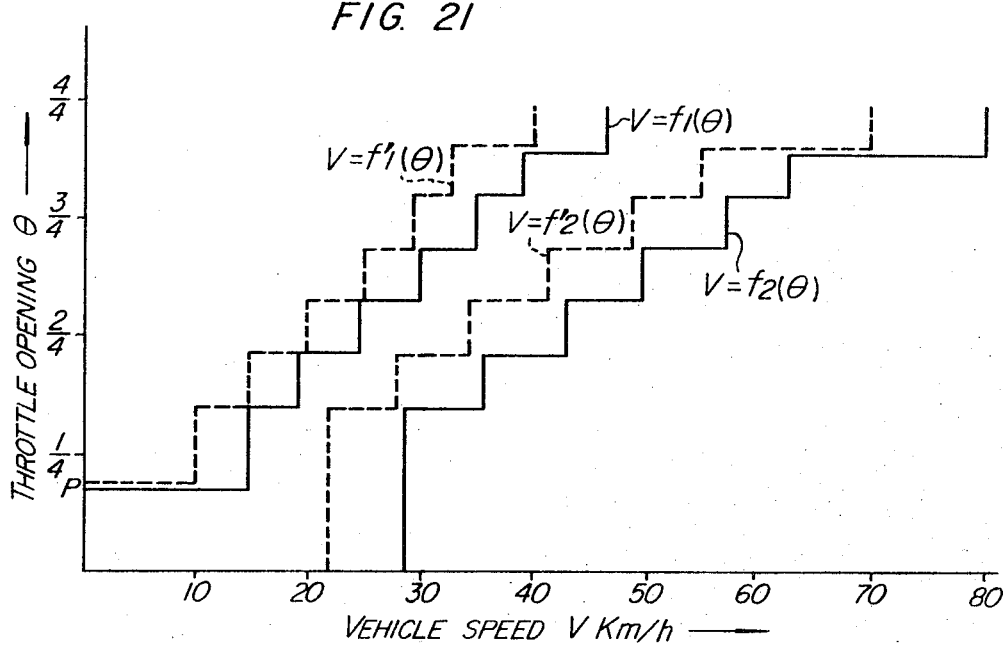
FIG. 21 is a shift diagram showing one example of the shift regions according to the present invention.

The second speed starting circuit 381 having such a structure is used to start the vehicle in second gear in a low loaded state of the engine, for example, at a throttle valve opening of 0.7/4. To this end, a constant voltage $E_{n2}$, which is sufficiently higher than the voltage applied from the throttle position responsive circuit 320 to the signal input terminal 335b, is applied to the vehicle speed responsive signal input terminal 335a of the comparator 335 shown in FIG. 18 so that the second speed starting signal can be delivered from the comparator 335 in the off position of the throttle switch 382 even when no vehicle speed responsive signal is generated due to the fact that the vehicle is at rest. More precisely, in the low loaded state of the engine, the throttle switch 382 is in the off position and no base current is supplied to the first transistor 392 acting as a semiconductor relay, thereby turning off the first transistor 392. In this situation, base current is supplied to the base of the second transistor 386. As a result, the transistor 386 conducts and the constant voltage signal $E_{n2}$ is applied to the vehicle speed responsive signal input terminal 335a of the comparator 335 by the lead 394 through the diode 385. The voltage signal $E_{n2}$ is given by $$E_{n2} = \frac{R_{387}}{R_{388}+R_{387}} \cdot E,$$

where $R_{388}$ is the resistance of the resistor 388, $R_{387}$ is the resistance of the resistor 387 and $E$ is the constant voltage applied to the lead 395 from the power supply. Suppose that this constant voltage $E_{n2}$ is greater than $AE_{(1)}$, that is, $E_{n2} < AE_{(1)}$, then a second speed gear region appears when the throttle valve opening is less than the predetermined setting, $P = 0.7/4$ at a vehicle speed of zero kilometers per hour as shown in FIG. 21 and the vehicle can be started in second gear. As the load on the engine is increased until the throttle switch 382 is turned on, the first transistor 392 is now turned on and the second transistor 386 is cut off. As a result, no constant voltage $E_{n2}$ is any longer supplied from the second speed starting circuit 381. In this case, the 1–2 shift point computer circuit 380 operates in the same manner as the 2–3 shift point computer circuit 361 so that a first speed gear region appears at a throttle valve opening of more than the predetermined setting $P$ and the vehicle can be started in first gear. The diode 385 prevents the vehicle speed responsive signal voltage supplied to the input terminal 333 of the comparator 335 from being fed back to the second speed starting circuit 381.

SHIFT CONTROL OPERATION

The relation between the speed ratio of the transmission and the operating state of the solenoids has been given in the description concerning the hydraulic actuating system. This relation can be summarized as follows:

TABLE 1

| Gear position | Solenoid 132 | Solenoid 137 |
|---|---|---|
| First speed | Energized | Energized |
| Second speed | De-energized | Energized |
| Third speed | De-energized | De-energized |

1–2 SHIFT CONTROL

The relation between the signal $E_n$ representative of the output shaft r.p.m. and the signal $E_{(N)}$ representative of the throttle position shown in FIG. 20 may be expressed in terms of the relation between the vehicle speed V and the throttle position or opening $\theta$ as shown in FIG. 21 to which the operation of the second speed starting circuit 381 is also added. It will be seen from FIG. 21 that the voltage applied to the vehicle speed responsive voltage input terminal 335a of the comparator 335 is greater than the voltage $AE_{(1)}$ applied to the throttle position responsive voltage input terminal 335b of the comparator 335 at a throttle valve opening of less than the predetermined setting P, and the second speed starting signal is necessarily delivered from the 1-2 shift point computer circuit 380. At a throttle valve opening of more than the predetermined setting P, the relation shown in FIG. 20 holds. Thus, a shift from first to second gear normally takes place when the driving condition of the vehicle makes a shift to the right-hand side or high speed side of the curve $V=f_1(\theta)$ shown in FIG. 21, since, in such a state, the relation $E_n \geq AE_{(N)}$ holds, "0" or no voltage is delivered from the discriminating circuit 330 and the solenoid 132 is de-energized. In the second gear position, no voltage is supplied to the feedback circuit 340 and the NPN transistor 341 is cut off. As a result, the rate of division of the signal $E_n$ representative of the output shaft r.p.m. by the variable resistors is varied and now the discriminating circuit 330 starts to carry out the computation of the relation $E_n \geq A'E_{(N)}$. Therefore, the subsequent shift from second to first gear occurs on the curve $V=f_1'(\theta)$, and shift to the left-hand side or low speed side of the curve $V=f_1'(\theta)$ results in the energization of the solenoid 132 thereby shifting the gear from second to first gear. The difference between the shift point from first to second gear and the shift point from second to first gear is generally necessarily provided in automatic transmissions in order to ensure stable shifting.

2-3 SHIFT CONTROL

The shift point (line) from second to third gear determined by the 2-3 shift point computer circuit 361 is represented by the curve $V=f_2(\theta)$ shown in FIG. 21. When a shift to the right-hand side or high speed side of the curve $V=f_2(\theta)$ occurs, no voltage signal appears on the output lead 331' of the discriminating circuit 330', and the solenoid 137 is de-energized to cause an upshift from second to third gear. Since "0" appears on the output lead 331' of the discriminating circuit 330', no voltage is supplied to the feedback circuit 340' and the NPN transistor 341' is cut off. Thus, the computation of $E_n \geq B'E_{(N)}$ is carried out by the discriminating circuit 330' as in the case of the discriminating circuit 330 in the 1-2 shift point computing circuit 358. Therefore, in the absence of any output voltage appearing on the output lead 331', the subsequent down shift from third to second gear takes place on the curve $V = f_2'(\theta)$. A shift to the left-hand side or low speed side of the curve $V = f_2'(\theta)$ results in the energization of the solenoid 137 to cause the downshift from third to second gear.

While an embodiment of the present invention has been described with reference to its application to an automatic transmission having three forward speeds and one reverse speed, it is also applicable with certain modifications to an automatic transmission having two, four or more forward speeds and one reverse speed.

Figure 22:
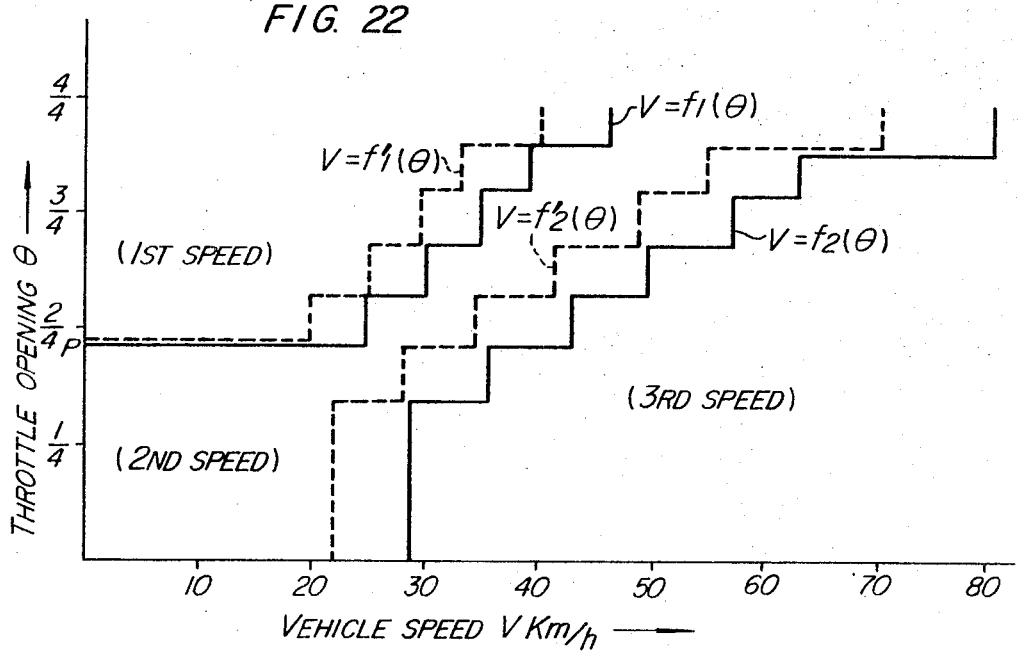
FIG. 22 is a shift diagram showing another example of the shift regions according to the present invention.

Further, in the embodiment described by way of example, the contact of the throttle switch 382 for the second speed starting is set to be closed at the throttle position P in FIG. 21, however, it may be substituted by the contacts 324, 325, etc. of the multi-contact switch 322 which contacts correspond to the stepped throttle position voltages $E_{(1)}$, $E_{(2)}$, etc., thereby simplifying the construction of the electrical circuit. The throttle switch 382 for the second speed starting may be eliminated when a shift diagram as shown in FIG. 22 is desired, although this shift diagram may be realized by the method employed in the embodiment of the present invention. To effect this, a constant voltage $E_{n2}$ which is larger than $AE_{(2)}$ and smaller than $AE_{(3)}$ (FIG. 20) may continuously applied to the vehicle speed responsive signal input terminal 335a of the discriminating circuit 330 in the 1-2 shift point computer circuit 380 shown in FIG. 18. By this arrangement, not only the throttle switch 382 in FIG. 19 can be eliminated, but also the semiconductor relays 392 and 386 in the second speed starting circuit 381 become unnecessary. In this case, the power supply voltage supplied by the lead 395 may be reduced to a predetermined value by the resistor 388 and this predetermined voltage may be applied through the diode 385 to the vehicle speed responsive signal input terminal 335a of the comparator 335.

Figure 23:
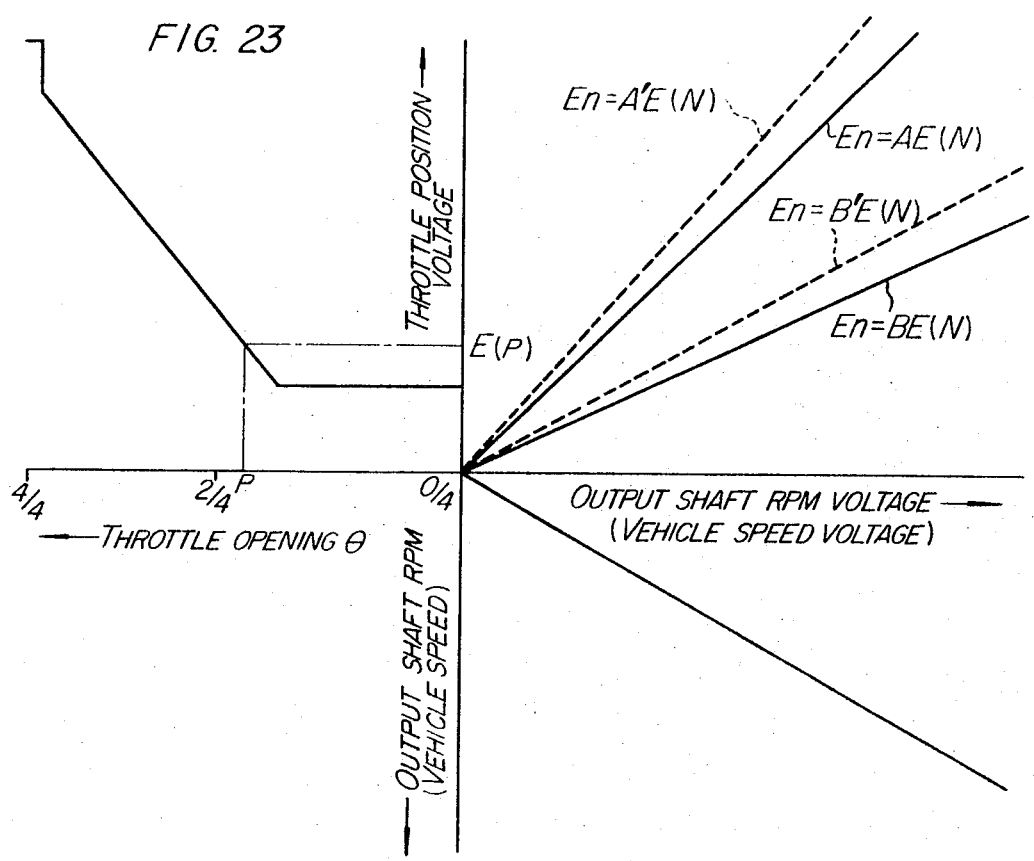
FIG. 23 is a chart showing the relation between a signal representative of the output shaft r.p.m. and a signal representative of the throttle position in a modification of the present invention.
Figure 24:
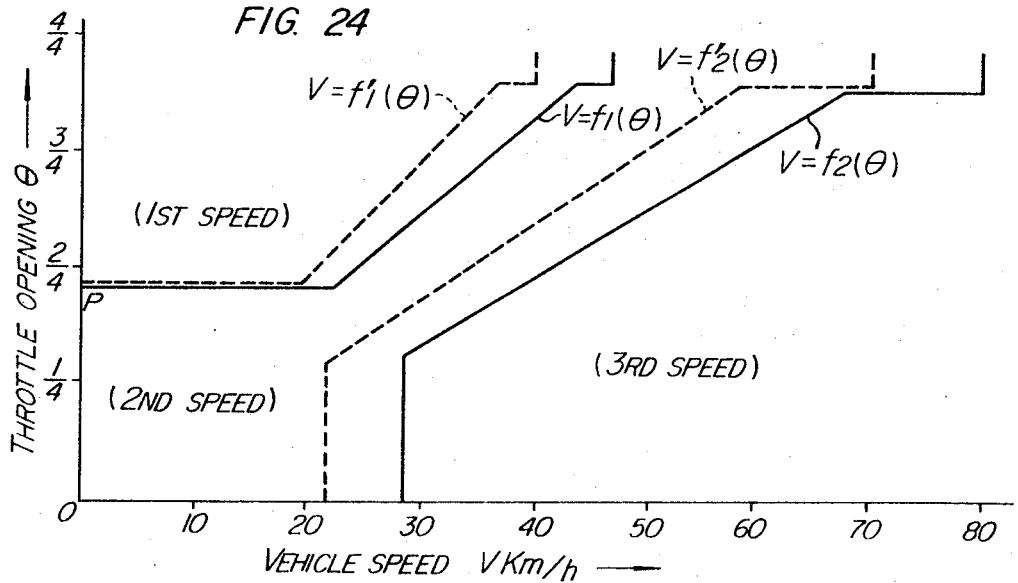
FIG. 24 is a shift diagram showing one example of the shift regions according to the modification shown in FIG. 23.

Further, the throttle position responsive voltage may be varied linearly with respect to the throttle position although this voltage is varied stepwise relative to the throttle position in the embodiment described hereinbefore. In this case too, the method employed in the embodiment of the present invention may be used, but it is more preferable to supply a constant voltage $E_{n2} = AE_{(p)}$, where $E_{(p)}$ is the throttle position responsive voltage corresponding to a throttle position p as shown in FIG. 23, to the vehicle speed responsive signal input terminal 335a of the comparator 335, thereby to eliminate the throttle switch 382 and the semiconductor relays 392 and 386.

Furthermore, a signal representative of the negative pressure in the air intake pipe or any other suitable signal may be employed to represent the load on the engine in lieu of the throttle position responsive signal used in the embodiment of the present invention.

In the embodiment of the present invention described hereinbefore, a constant positive voltage is supplied to the vehicle speed responsive signal input terminal 335a of the comparator 335 for enabling the starting in second gear, but a constant negative voltage may be applied to the throttle position responsive segnal input terminal 335b of the comparator 335 to attain the same purpose.

While an embodiment of the present invention and its modifications have been described by way of example, it will be apparent to those skilled in the art that the present invention is in no way limited to such specific embodiments and many other changes and modifications may be made therein without departing from the scope of the appended claims.

We claim:

1. In an automatic transmission for an engine-driven vehicle having a torque converter, a gear unit for forming first and second forward gear ratios to effect first and second gears and frictionally engaging means for accomplishing the selective meshing engagement of the gears in said gear unit, an automatic shift control system comprising means for producing gear ratio changes by actuating said frictionally engaging means, means for generating a signal voltage responsive to the engine torque or throttle position, means for generating a signal voltage responsive to the r.p.m. of the transmission output shaft or vehicle speed, at least one shift point computer circuit including a discriminating circuit having input terminals connected to both of said generating means to receive the output voltages from said generating means, for generating a shift signal to actuate said gear ratio change producing means as between said gears when one of the two voltages generated by said generating means or the relation between said two voltages satisfies a predetermined condition, and a second gear starting circuit connected to one of said input terminals of said discriminating circuit for applying a predetermined voltage to said one input terminal so that a second gear starting voltage can be delivered from said discriminating circuit, whereby the vehicle can be started in first or second gear, depending on the absence or presence of the predetermined voltage applied to said one input terminal of said discriminating circuit.

2. An automatic shift control system as claimed in claim 1, in which a switch means responsive to the position of the engine throttle valve is connected to said second gear starting circuit and is kept turned off until the opening of the throttle valve attains a predetermined setting.

3. An automatic shift control system as claimed in claim 2, in which said second gear starting circuit includes a pair of semiconductor relays and a lead connected to a source of constant voltage so that a constant voltage can be supplied to the vehicle speed responsive signal input terminal of said discriminating circuit in the open position of said switch means and the supply of the constant voltage is ceased when said switch means is urged to its closed position due to the increase in the opening of said throttle valve beyond the predetermined setting.

4. In an automatic transmission for an engine-driven vehicle having a torque converter, a gear unit having first and second ratio gears and frictionally engaging means for accomplishing the selective meshing engagement of the gears in said gear unit, an automatic shift control system comprising
 means for producing gear ratio changes by actuating said frictionally engaging means,
 means for generating a signal voltage responsive to the engine torque or throttle position,
 means for generating a signal voltage responsive to the r.p.m. of the transmission output shaft or vehicle speed,
 at least one shift point computer circuit including a discriminating circuit having input terminals connected to said signal voltage generating means to receive the output signal voltages from said signal voltage generating means and generating a shift signal for actuating said means for producing a ratio change between the first and second gears when one of the two signal voltages generated by said signal voltage generating means or the relation between said two signal voltages satisfies a predetermined condition, and
 a second speed starting circuit for producing a first predetermined voltage when the throttle opening is smaller than a predetermined magnitude and producing zero voltage or a second predetermined voltage lower than said first predetermined voltage when the throttle opening is larger than said predetermined magnitude, the output of said second speed starting circuit being connected to one of the input terminals of said discriminating circuit for receiving an output shaft signal voltage so that said first predetermined voltage from said second speed starting circuit is applied to said output shaft signal voltage input terminal of said discriminating circuit when the throttle opening is smaller than said predetermined magnitude, thereby resulting in a signal voltage higher than the output shaft signal voltage for a standing state of the vehicle being applied to said output shaft signal voltage input terminal of said discriminating circuit, whereby a condition for establishing the second gear position is satisfied in said discriminating circuit to thereby cause said discriminating circuit to produce an output signal for establishing the second gear position.

5. In an automatic transmission for an engine-driven vehicle having a torque converter, a gear unit having a plurality of different ratio gears and frictionally engaging means for accomplishing the selective meshing engagement of the gears in said gear unit, an automatic shift control system comprising:
 means for producing gear ratio changes by actuating said frictionally engaging means,
 first means for generating a signal voltage responsive to the engine torque or throttle position,
 second means for generating a signal voltage representing vehicle speed,
 computer circuit means having a first input terminal connected to said first generating means and a second input terminal connected to the other generating means and having a predetermined setting for each gear ratio change for generating a shift signal to actuate said gear ratio change producing means when one of the two signal voltages generated by said signal voltage generating means or the relation between said two signal voltages satisfies a predetermined condition, and
 an upper gear starting circuit for producing a first predetermined voltage when the throttle opening is smaller than a predetermined magnitude, and producing a second predetermined voltage which is lower than said first predetermined voltage when the throttle opening is larger than said predetermined magnitude, said upper starting circuit being connected to said second input terminal so that said first predetermined voltage from said upper speed starting circuit is applied to the second input terminal when the throttle opening is smaller than said predetermined magnitude, thereby a signal voltage which is higher than the vehicle speed signal voltage for a standing state of the vehicle being applied to the second input terminal, whereby a condition for establishing the upper gear position is satisfied in said computer circuit means to thereby cause said computer circuit means to produce an output signal for establishing the upper gear position.

6. In an automatic transmission for an engine-driven vehicle having a torque converter, a gear unit having a plurality of different ratio gears and frictionally engaging means for accomplishing the selective meshing engagement of the gears in said gear unit, an automatic shift control system comprising
 means for producing ratio changes by actuating said frictionally engaging means
 first means for generating a signal voltage responsive to the engine torque or throttle position,
 second means for generating a signal voltage representing vehicle speed,
 computer circuit means having a first input terminal connected to said first generating means and a second input terminal connected to the other generating means and having a predetermined setting for each gear ratio change for generating a shift signal to actuate said ratio change producing means as between said ratio gears when one of the two signals generated by said signal voltage generating means or the relation between said two voltages satisfies a predetermined condition, and
 an upper gear starting circuit means connected to the second input terminal of said computer circuit means for generating and applying thereto a predetermined voltage which corresponds to one of the predetermined settings of said computer circuit means, whereby the vehicle can be started in the one of said ratio gears whose gear ratio is smaller only when said predetermined voltage is applied to said second signal input terminal.

7. An automatic shift control system as in claim 6, in which said upper starting circuit means includes switch means which is responsive to the position of the engine throttle valve and which is kept turned off until the opening of the throttle valve attains a predetermined setting.

8. An automatic shift control system as in claim 7, in which said upper starting circuit means includes a pair of semiconductor relays and a lead connected to a source of constant voltage which corresponds to the one of the predetermined settings of said computer circuit means so that a constant voltage can be supplied to the second input terminal of said computer circuit means in the open position of said switch means and the supply of the constant voltage stops when said switch means is urged to its closed position due to the increase in the opening of said throttle valve beyond the predetermined setting.

9. In a automatic transmission for an engine-driven vehicle having a torque converter, a gear unit having lower and upper ratio gears and frictionally engaging means for accomplishing the selective meshing engagement of the gears in said gear unit, an automatic shift control system comprising means for producing ratio changes by actuating said frictionally engaging means, means for generating a signal voltage responsive to the throttle position, means for generating a signal voltage responsive to the vehicle speed, computer circuit means having a first input terminal connected to said throttle position responsive signal voltage generating means and a second input terminal connected to the other generating means and having a predetermined setting for upshift and downshift ratio change for generating a shift signal to actuate said ratio change producing means when one of the two signals generated by said signal voltage generating means or the relation between said two signal voltages satisfies a predetermined condition, and an upper gear starting circuit means connected to the second input terminal of said computer circuit means for generating a predetermined voltage which is corresponding to the upshift setting of said computer circuit means, whereby the vehicle can be started in the upper ratio gear.

10. An automatic shift control system as in claim 9 in which said upper starting circuit means includes a switch means, said switch means being responsive to the position of the engine throttle valve and being kept turned off until the opening of the throttle valve attains a predetermined setting.

11. An automatic shift control system as claimed in claim 10 in which said upper starting circuit means includes a pair of semiconductor relays and a lead connected to a source of constant voltage which corresponds to the upshift setting so that a constant voltage can be supplied to the second input terminal of said computer circuit means in the open position of said switch means and the supply of the constant voltage is ceased when said switch means is urged to its closed position due to the increase in the opening of said throttle valve beyond the predetermined setting.

* * * * *